(12) United States Patent (10) Patent No.: US 12,469,277 B2
Li et al. (45) Date of Patent: Nov. 11, 2025

(54) IMAGE PROCESSING METHOD, APPARATUS AND DEVICE, AND COMPUTER-READABLE STORAGE MEDIUM

(71) Applicant: Shanghai Artificial Intelligence Innovation Center, Shanghai (CN)

(72) Inventors: Hongyang Li, Shanghai (CN); Zhiqi Li, Shanghai (CN); Wenhai Wang, Shanghai (CN); Chonghao Sima, Shanghai (CN); Li Chen, Shanghai (CN); Yang Li, Shanghai (CN); Yu Qiao, Shanghai (CN); Jifeng Dai, Shanghai (CN)

(73) Assignee: Shanghai Artificial Intelligence Innovation Center, Shanghai (CN)

( * ) Notice: Subject to any disclaimer, the term of this patent is extended or adjusted under 35 U.S.C. 154(b) by 464 days.

(21) Appl. No.: 18/163,427

(22) Filed: Feb. 2, 2023

(65) Prior Publication Data

US 2023/0316742 A1 Oct. 5, 2023

(30) Foreign Application Priority Data

Mar. 30, 2022 (CN) .......................... 202210334021.1

(51) Int. Cl.
*G06V 20/20* (2022.01)
*G06T 7/20* (2017.01)
(Continued)

(52) U.S. Cl.
CPC ................ *G06V 20/17* (2022.01); *G06T 7/20* (2013.01); *G06V 10/24* (2022.01); *G06V 10/44* (2022.01);
(Continued)

(58) Field of Classification Search
CPC ........ G06V 20/17; G06V 10/24; G06V 10/44; G06V 10/62; G06V 10/806; G06V 10/454;
(Continued)

(56) References Cited

U.S. PATENT DOCUMENTS 10,311,719 B1* 6/2019 Swaminathan ........ G08G 1/042
10,522,040 B2* 12/2019 Yang ........................ G08G 1/04
(Continued)

FOREIGN PATENT DOCUMENTS

CN 102045489 A 5/2011
CN 102790891 A 11/2012
(Continued)

*Primary Examiner* — Philip P. Dang
(74) *Attorney, Agent, or Firm* — Nitin Kaushik

(57) ABSTRACT

The embodiments of the present application discloses an image processing method, an image processing apparatus, an image processing device and a computer-readable storage medium. The method comprises: obtaining a plurality of view images captured by a plurality of acquisition apparatuses at different views on a vehicle and an aerial view feature at a previous moment of a current moment; extracting temporal information from the aerial view feature at the previous moment according to a preset aerial view query vector, extracting spatial information from a plurality of view image features corresponding to the plurality of view images, and combining the temporal information and the spatial information to generate an aerial view feature at the current moment, wherein the preset aerial view query vector corresponds to a three-dimensional physical world which is a preset range away from the vehicle in a real scene at the current moment.

15 Claims, 18 Drawing Sheets

(51) Int. Cl.
*G06V 10/24* (2022.01)
*G06V 10/44* (2022.01)
*G06V 10/62* (2022.01)
*G06V 10/80* (2022.01)
*G06V 20/17* (2022.01)

(52) U.S. Cl.
CPC ............ *G06V 10/62* (2022.01); *G06V 10/806* (2022.01); *G06T 2207/30252* (2013.01)

(58) Field of Classification Search
CPC .... G06V 10/7515; G06V 10/82; G06V 20/58; G06T 7/20; G06T 2207/30252; G06T 2207/20081; G06T 2207/10032; G06T 2207/20084; G06T 7/246; G06F 18/253
See application file for complete search history.

(56) References Cited

U.S. PATENT DOCUMENTS

| | | | |
|---|---|---|---|
| 10,977,772 B1* | 4/2021 | Woo | G06T 3/40 |
| 11,328,517 B2* | 5/2022 | Vaquero Gomez | G06V 20/10 |
| 11,430,218 B2* | 8/2022 | Li | G06T 7/33 |
| 11,455,813 B2* | 9/2022 | Liu | G06T 7/579 |
| 11,521,396 B1* | 12/2022 | Jain | G06F 18/2415 |
| 11,900,257 B2* | 2/2024 | Hoyer | G05D 1/249 |
| 11,921,824 B1* | 3/2024 | Hester | G06N 3/045 |
| 11,960,290 B2* | 4/2024 | Laddha | G06F 18/24147 |
| 12,007,728 B1* | 6/2024 | Mohta | G06V 20/56 |
| 2023/0298311 A1* | 9/2023 | Rodrigues | G06V 20/10 382/218 |

FOREIGN PATENT DOCUMENTS

| | | | | |
|---|---|---|---|---|
| CN | 107580029 A | | 1/2018 | |
| GB | 2573792 | * | 5/2018 | ............. G06T 17/00 |
| WO | WO-2021097229 A1 | * | 5/2021 | ............. G06V 20/70 |
| WO | WO-2022087751 A1 | * | 5/2022 | ............. G06V 10/82 |

* cited by examiner

Three-dimensional target detection results under aerial view

Map semantic segmentation results

IMAGE PROCESSING METHOD, APPARATUS AND DEVICE, AND COMPUTER-READABLE STORAGE MEDIUM

CROSS-REFERENCE TO RELATED APPLICATIONS

The application claims priority to Chinese patent application No. 202210334021.1, filed on Mar. 30, 2022, the entire contents of which are incorporated herein by reference.

TECHNICAL FIELD

The present application relates to the technical field of a computer, and in particular, to an image processing method, an image processing apparatus, an image processing device and a computer-readable storage medium.

BACKGROUND

The rapid development of artificial intelligence has made autonomous driving possible. In order to ensure the driving safety of the autonomous vehicle, an aerial view is predicted according to a large amount of image data, and then different perception tasks are processed according to the aerial view, for example, lane line detection, road segmentation, target detection and track planning, so as to obtain perception task results, wherein the perception task results are of great significance in fields of traffic and the like, and the driving safety of the autonomous vehicle can be ensured.

In the prior art, two-dimensional image information is converted into an aerial view feature, when a perception task is processed, different samples are adopted, for example, three-dimensional point cloud data obtained by using a laser radar and a two-dimensional image obtained by using a camera, different models are trained for each perception task, and then the corresponding perception tasks are processed based on the converted aerial view feature by adopting the trained models for the tasks.

However, the aerial view feature obtained by the conversion of the two-dimensional image information cannot capture the occluded object well, and the accuracy of the aerial view feature is reduced. In addition, the autonomous driving task often comprises a plurality of perception tasks, these tasks need to be designed separately in the prior art, each perception task needs a separate model, under the condition of limited resources, the image processing time is prolonged, the time delay occurs, and the processing efficiency of the perception tasks is reduced.

SUMMARY

The embodiments of the present application provide an image processing method, an image processing apparatus, an image processing device and a computer-readable storage medium, and improve accuracy of an aerial view feature and processing efficiency of perception tasks.

The technical schemes of the embodiments of the present application are realized as follows.

In a first aspect, an embodiment of the present application provides an image processing method, wherein the method comprises: obtaining a plurality of view images captured by a plurality of acquisition apparatuses at different views on a vehicle and an aerial view feature at a previous moment of a current moment; extracting temporal information from the aerial view feature at the previous moment according to a preset aerial view query vector, extracting spatial information from a plurality of view image features corresponding to the plurality of view images, and combining the temporal information and the spatial information to generate an aerial view feature at the current moment, wherein the preset aerial view query vector corresponds to a three-dimensional physical world which is a preset range away from the vehicle in a real scene at the current moment; and performing prediction on a perception task according to the aerial view feature at the current moment to obtain a perception task result.

In a second aspect, an embodiment of the present application provides an image processing apparatus, wherein the apparatus comprises: an obtaining module, configured to obtain a plurality of view images captured by a plurality of acquisition apparatuses at different views on a vehicle and an aerial view feature at a previous moment of a current moment; a generation module, configured to extract temporal information from the aerial view feature at the previous moment according to a preset aerial view query vector, extract spatial information from a plurality of view image features corresponding to the plurality of view images, and combine the temporal information and the spatial information to generate an aerial view feature at the current moment, wherein the preset aerial view query vector corresponds to a three-dimensional physical world which is a preset range away from the vehicle in a real scene at the current moment; and a prediction module, configured to perform prediction on a perception task according to the aerial view feature at the current moment to obtain a perception task result.

In a third aspect, an embodiment of the present application provides an image processing device, wherein the device comprises: a memory, configured to store an executable computer program; and a processor, configured to implement the image processing method when executing the executable computer program stored in the memory.

In a fourth aspect, an embodiment of the present application provides a computer-readable storage medium having a computer program stored thereon that, when executed by a processor, is configured to implement the image processing method.

The embodiments of the present application provides an image processing method, an image processing apparatus, an image processing device and a computer-readable storage medium. According to the schemes provided in the embodiments of the present application, a plurality of view images captured by a plurality of acquisition apparatuses at different views on a vehicle and an aerial view feature at a previous moment of a current moment are obtained: temporal information is extracted from the aerial view feature at the previous moment according to a preset aerial view query vector, spatial information from a plurality of view image features corresponding to the plurality of view images is extracted, and the temporal information and the spatial information are combined to generate an aerial view feature at the current moment. The preset aerial view query vector corresponds to a three-dimensional physical world which is a preset range away from the vehicle in a real scene at the current moment. With the consideration of the spatial information of the current moment and the historical temporal information of the previous moment, the accuracy of the aerial view feature is improved. A perception task is predicted according to the aerial view feature at the current moment to obtain a perception task result. The generated aerial view feature can support the processing of a plurality of different perception tasks, and the step of performing feature extraction on different perception tasks by using

DETAILED DESCRIPTION

Figure 1:
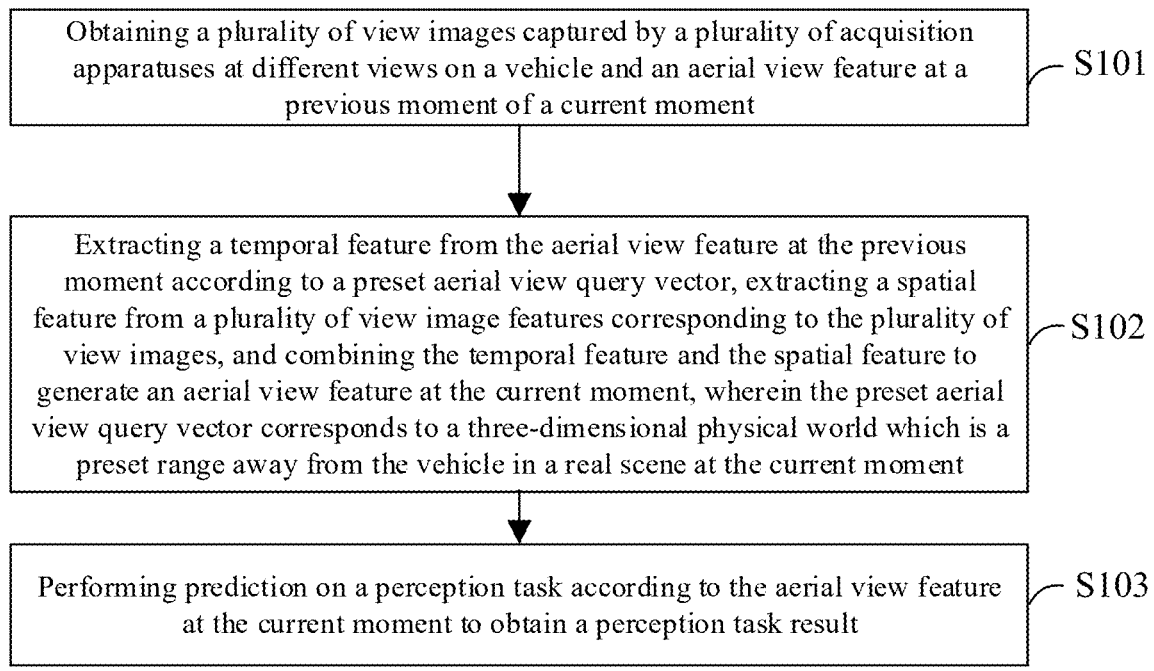
FIG. 1 is a flowchart illustrating optional steps of an image processing method provided in an embodiment of the present application.

The technical schemes in embodiments of the present application will be clearly and completely described below with reference to the drawings in the embodiments of the present application. It should be understood that some embodiments described herein are merely for explaining the technical schemes of the present application, and are not intended to limit the technical scope of the present application.

In order to better understand the image processing method according to an embodiment of the present application, before introducing the technical schemes of the embodiments of the present application, the related art is described first.

In order to better understand the image processing method according to an embodiment of the present application, before introducing the technical schemes of the embodiments of the present application, the application background is described firstly.

The image processing method provided in the embodiment of the present application can be applied to an autonomous driving scene. The correct perception of the environment is very important for autonomous driving, which determines whether a model can make the correct decision. Currently, the mainstream perception information mainly comes from a camera, a millimeter-wave radar, an ultrasonic radar and a laser radar, which have their own advantages and disadvantages. Illustratively, the camera can provide rich semantic information, e.g., color information, wherein the semantic information is very important in recognizing traffic signals. Meanwhile, compared with the laser radar and millimeter-wave radar, data acquired by the camera belongs to a projection of a three-dimensional space in a two-dimensional space, and information of one dimension, such as an object shape and depth information (a distance of an object from the camera), is naturally lost. Illustratively, the laser radar can generate cognition in a three-dimensional space very well, but its data can only describe the outline of a surface of an object and lacks semantic information such as color, Meanwhile, due to the cost of the laser radar, the application of the laser radar in practical scenes is limited. Illustratively, the millimeter-wave radar or ultrasonic radar has a wide application in the field of driving assistance at present, for example, collision warning for vehicles; however, the millimeter-wave radar can only be effective in a short range.

Next, the related art is described.

In the related art, the three-dimensional perception tasks based on pure vision include, but are not limited to, three-dimensional object detection and map semantic segmentation. The three-dimensional object detection task requires input information based on sensors, such as input images of a camera, and information on the size, position, and motion speed of an object in a predicted image in a three-dimensional space. The three-dimensional target detection task in the related art is generally similar to a two-dimensional target detection method, a two-dimensional detection frame needs to be recognized by a model first, and then a three-dimensional detection frame is predicted based on the two-dimensional detection frame through an additional model branch. Three examples are given here to explain the three-dimensional target detection task in the related art. Example 1: a three-dimensional detector for fully convolutional one-stage (FCOS) object detection directly predicts a three-dimensional detection frame of an object according to a center feature of the object. Example II: a three-dimensional detector for transformers for end-to-end object detection (DETR) predicts center points of a three-dimensional detection frame by using a set of learnable parameters based on the principle of DETR, then projects the center points in a three-dimensional space onto a two-dimensional image, obtains corresponding features, and finally fuses the features and predicts a final three-dimensional detection result. Example III, a novel full convolution method for three-dimensional object detection based on monocular or multi-view images, e.g., OFT and ImVoxelNet, fuses corresponding two-dimensional features by using volume elements pre-defined in three-dimensional space projected into a two-dimensional plane. The above three examples are only for designing the model for the three-dimensional target detection task, and when a plurality of perception tasks need to be processed, the three-dimensional target detection task needs to consume long time and more resources, so that the processing efficiency of the plurality of perception tasks is reduced.

In the related art, the map semantic segmentation task is to recognize information such as surrounding roads and lane lines under the perspective of an aerial view. Semantic segmentation is usually performed based on an aerial view feature. The simplest and most direct method for converting two-dimensional image information into aerial view feature pairs is inverse perspective mapping (IPM). Two examples are given here to explain the map semantic segmentation task in the related art. Example I: a method for generating an aerial view feature based on depth distribution, wherein the depth distribution is predicted for each pixel point, so that the pixel points on a two-dimensional plane are projected onto aerial view features through camera parameters (an intrinsic matrix and an extrinsic matrix). Example II, a view parsing network directly learns the conversion relationship between a two-dimensional plane and an aerial view by using a multi-layer perceptron. However, in the above two examples, the precision of converting the two-dimensional plane information to the aerial view features is low, and it is difficult to support accurate perception tasks.

The three-dimensional target detection schemes based on pure vision in the related art do not take the temporal information into consideration. Without the assistance of temporal information, the motion state of an object in an image cannot be determined, and an occluded object cannot be captured well. The spatial-temporal fusion algorithm based on the variability attention mechanism can effectively combine the temporal information and the spatial information to generate the aerial view feature. Because the generated aerial view feature comprises both spatial information and temporal information, the autonomous driving perception task is processed based on the generated aerial view feature, the motion speed and the position of an object in a driving scene can be estimated more accurately, and the object under low-visibility conditions has higher recall rate.

Autonomous driving tasks often include a plurality of perception tasks, such as three-dimensional object detection, map semantic segmentation and lane line position detection. In the related art, these tasks need to be designed separately, however, when the tasks with high delay requirements are processed in the autonomous driving task, if each sub-task needs a separate model, a large amount of computational overhead is caused, and the task processing time is increased. In addition, because the corresponding perception tasks are processed by adopting separate models, the task perception results generated by different models are easy to be inconsistent, for example, the position of a lane line is inconsistent with a result of the three-dimensional target detection, and serious interference is generated on a subsequent decision algorithm, so that the decision safety is reduced. The aerial view feature generated by the embodiments of the present application can simultaneously support various perception tasks, and different perception tasks can generate consistent perception task results by using the shared aerial view feature. In addition, different perception tasks share the most time-consuming backbone network (extracting a plurality of view image features) and an aerial view feature generator (generating aerial view features), so that the delay of obtaining a plurality of perception task results is reduced, and the processing efficiency of the perception tasks is improved.

In the related art, because the corresponding perception tasks are processed by adopting separate models, the task perception results generated by different models are easy to be inconsistent, for example, the position of a lane line is inconsistent with a result of the target detection, and serious interference is generated on a subsequent decision algorithm, so that the decision safety is reduced.

An embodiment of the present application provides an image processing method, and as shown in FIG. 1, FIG. 1 is a flowchart illustrating the steps of an image processing method provided in an embodiment of the present application, wherein the image processing method comprises the following steps.

S101. obtaining a plurality of view images captured by a plurality of acquisition apparatuses at different views on a vehicle and an aerial view feature at a previous moment of a current moment.

S102. extracting temporal information from the aerial view feature at the previous moment according to a preset aerial view query vector, extracting spatial information from a plurality of view image features corresponding to the plurality of view images, and combining the temporal information and the spatial information to generate an aerial view feature at the current moment, wherein the preset aerial view query vector corresponds to a three-dimensional physical world which is a preset range away from the vehicle in a real scene at the current moment.

Figure 2:
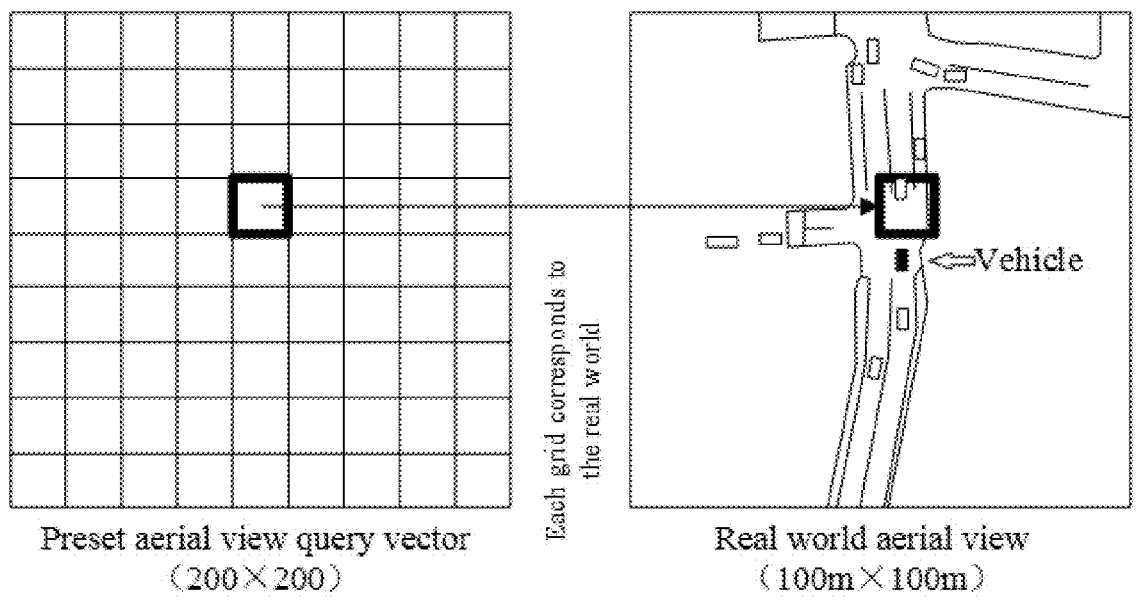
FIG. 2 is an exemplary schematic diagram of an aerial view query vector provided in an embodiment of the present application.

In the embodiment of the present application, as shown in FIG. 2, FIG. 2 is an exemplary schematic diagram of an aerial view query vector provided in an embodiment of the present application, the embodiment of the present application predefines a set of learnable parameters of a grid shape as aerial view query vectors with a tensor dimension of H×W×C, where H and W are length and width of the rasterized aerial view, and C is a feature dimension and contains height information, during the whole process of feature extraction and feature fusion, the information in the C dimension continuously changes, and the finally outputted aerial view query vectors are the aerial view features that fuse the spatial information at the current moment and the historical temporal information at the previous moment. The aerial view query vector corresponds to a physical world in a certain range around an ego vehicle (i.e., a vehicle) in the real world. The vector for each location in the aerial view query vector will correspond to a certain location in the real world. For example, the aerial view query vector with a length and a width of 200×200 is taken as an example, the range of the real world perceived by the aerial view query vector is based on the ego vehicle as the origin, wherein the horizontal axis is from −50 m to 50 m, and the vertical axis is from −50 m to 50 m; that is, the size of the aerial view of the real world is 100 m×100 m, therefore, each grid corresponds to a range of 0.5 m×0.5 m in the real world. The aerial view query vector functions to capture real-world information at each 0.5 m×0.5 m range, such as lane lines, pedestrians, vehicles, signs, and traffic lights.

It should be noted that the preset aerial view query vector is the aerial view query vector at the current moment; it can be understood that the aerial view query vectors corresponding to the moments are the same in meaning, and all correspond to the three-dimensional physical world within the preset range from the vehicle in the real scene at the current moment, and are used for capturing the information of the real world at the corresponding range: since the positions of the vehicle corresponding to each moment are different, and the corresponding three-dimensional physical worlds are also different; in terms of actual content, the aerial view query vectors for each moment are different from each other in actual content.

In the related art, the perception task processing can be completed by detection and recognition based on an attention mechanism, and a final prediction result can be directly obtained from the image feature by adopting a set of learnable parameters and through a cross-attention mechanism. However, since the perception algorithm based on the attention mechanism is a global attention mechanism, which has extremely long training time, the processing efficiency of the perception task is reduced. In the embodiment of the present application, according to a preset aerial view query vector, temporal information is extracted from an aerial view feature at a previous moment based on a spatial-temporal fusion algorithm of a variability attention mechanism, and spatial information is extracted from a plurality of view image features corresponding to a plurality of view images. The adoption of a perception algorithm of a variability attention mechanism can solve the problem of long training time. Unlike the conventional attention mechanism, the variability attention mechanism only samples K points around the sampling point for each query vector; compared with the global attention mechanism, the computation complexity is greatly reduced, the training pressure is reduced, and the information extraction efficiency is improved. In addition, based on the variability attention mechanism, a spatial cross-attention mechanism suitable for extracting spatial information and a temporal self-attention mechanism suitable for fusing the temporal information are proposed, so as to improve the processing efficiency of the perception task in the following.

Compared with the pure visual perception algorithm in the related art which only utilizes spatial information, the image processing method provided in the embodiment of the present application can combine temporal information and spatial information at the same time, so that the motion state of an object can be more accurately predicted, the highly-occluded object can be detected, and the accuracy of the aerial view feature is improved.

S103. performing prediction on a perception task according to the aerial view feature at the current moment to obtain a perception task result.

In the embodiment of the present application, after the aerial view feature at the current moment is obtained, one convolution head may be allocated to each perception task for parsing, so as to obtain a result corresponding to the perception task.

Illustratively, the semantic segmentation at the time of object segmentation is taken as an example for explanation, and after the aerial view feature at the current moment is obtained, a map semantic segmentation task needs to be executed, and one two-dimensional convolution head is allocated to the map semantic segmentation task, which can also be understood as a map semantic segmentation task branch, and the probabilities of the corresponding categories are generated by normalizing the softmax function, thereby generating a map semantic segmentation result of the area around the vehicle under the aerial view.

Illustratively, after the aerial view feature at the current moment is obtained, a three-dimensional object detection task needs to be executed, a convolution head is allocated to the three-dimensional object detection task, which can also be understood as a three-dimensional object detection task branch, and three-dimensional object detection is performed by combining the aerial view feature at the current moment through the three-dimensional object detection task branch, wherein the three-dimensional object detection can be to detect the position information of objects (including pedestrians, vehicles, signs, greenbelts, traffic lights, and the like) under the aerial view, and the position information can include the size, position, speed, type, and the like of the objects in the three-dimensional space.

Illustratively, after the semantic segmentation result is obtained by performing task processing of semantic segmentation on the aerial view feature through the map semantic segmentation task branch, the semantic segmentation result and the navigation instruction may be inputted into a track planning task branch to perform track planning, so as to obtain a track planning result, that is, a driving track at a future time.

Compared with the perception prediction method based on the aerial view feature in the related art, where one model can only solve a single perception task, for example, two separate models are needed to solve three-dimensional object detection and map semantic segmentation, the embodiment of the present application can enable different perception tasks to share the aerial view feature at the same time, and each perception task only needs one lightweight task convolution head, therefore, the computational burden is reduced, and the reasoning speed of the perception task is improved.

According to the schemes provided in the embodiments of the present application, a plurality of view images captured by a plurality of acquisition apparatuses at different views on a vehicle and an aerial view feature at a previous moment of a current moment are obtained; temporal information is extracted from the aerial view feature at the previous moment according to a preset aerial view query vector, spatial information from a plurality of view image features corresponding to the plurality of view images is extracted, and the temporal information and the spatial information are combined to generate an aerial view feature at the current moment. The preset aerial view query vector corresponds to a three-dimensional physical world which is a preset range away from the vehicle in a real scene at the current moment. With the consideration of the spatial information of the current moment and the historical temporal information of the previous moment, the accuracy of the aerial view feature is improved. A perception task is predicted according to the aerial view feature at the current moment to obtain a perception task result. The generated aerial view feature can support the processing of a plurality of different perception tasks, and the step of performing feature extraction on different perception tasks by using different acquired data is not needed, so that the image processing time is shortened, and the efficiency of the perception tasks is improved.

Figure 3:
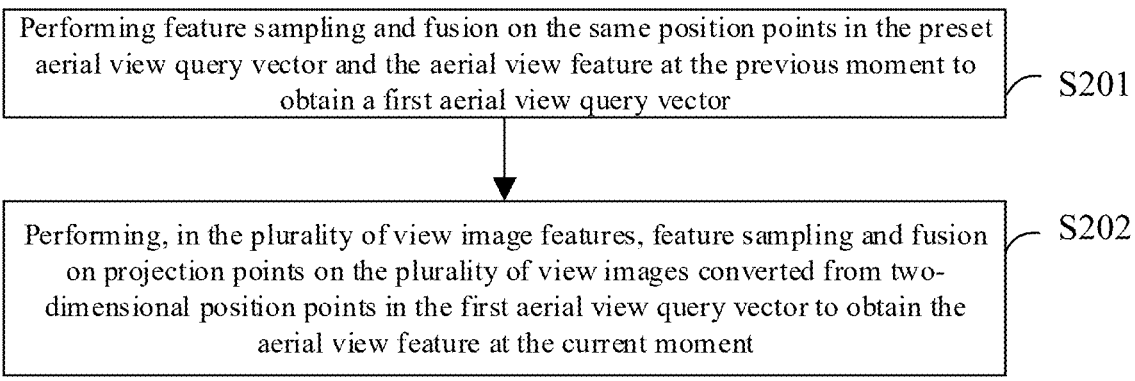
FIG. 3 is a flowchart illustrating optional steps of another image processing method provided in an embodiment of the present application.

In some embodiments, the S102 in FIG. 1 described above may be implemented by S201 and S202. As shown in FIG. 3. FIG. 3 is a flowchart illustrating optional steps of another image processing method provided in an embodiment of the present application.

S201. performing feature sampling and fusion on the same position points in the preset aerial view query vector and the aerial view feature at the previous moment to obtain a first aerial view query vector.

In the embodiment of the present application, since the preset aerial view query vector and the aerial view feature at the previous moment both comprise features of position points in the three-dimensional physical world, the same position points representing the same three-dimensional physical world can be found in the preset aerial view query vector and the aerial view feature at the previous moment by means of alignment, position point labeling or the like, for example, the location points that represent the same crossroad in the preset aerial view query vector and the aerial view feature at the previous moment are the same location points. Feature sampling and interactive fusion are performed on the features of the same position points, and an aerial view query vector with temporal information fused is obtained and is represented herein by a first aerial view query vector.

The embodiment of the present application provides a temporal self-attention mechanism, wherein the temporal self-attention mechanism belongs to a variability attention mechanism. Self-attention interaction is performed by using a temporal attention mechanism according to the aerial view query vector at the current moment and the aerial view feature at the previous moment, so as to capture temporal information and obtain a first aerial view query vector.

S202. performing, in the plurality of view image features, feature sampling and fusion on projection points on the plurality of view images converted from two-dimensional position points in the first aerial view query vector to obtain the aerial view feature at the current moment.

In the embodiment of the present application, the first aerial view query vector comprises features of the position points with the temporal information fused in the three-dimensional physical world, and the plurality of view image features comprise features of projection points of three-dimensional spatial points in the three-dimensional space projected onto the plurality of view images; therefore, the two-dimensional position points can be converted into three-dimensional spatial points with height, and then projection points can be obtained on the plurality of view images in a projection mode, that is, the two-dimensional position points and the plurality of view images have corresponding relations, and an aerial view query vector with temporal information and spatial information fused can be obtained by performing sampling and interactive fusing on the projection points, and is represented by the aerial view query vector at the current moment.

The embodiment of the present application provides a spatial cross-attention mechanism, wherein the spatial cross-attention mechanism belongs to a variability attention mechanism, and performs interaction according to a first aerial view query vector and a plurality of view image features to capture spatial information.

In the related art, temporal information and spatial information within a time period are obtained by simply superposing the aerial view features at different moments, however, in the simple feature superposition method, the temporal information and the spatial information are not effectively fused, so that the accuracy of the aerial view features is reduced.

According to the image processing method provided in the embodiment of the present application, through the temporal self-attention mechanism and the spatial cross-attention mechanism, when the aerial view feature at the current moment is generated, the spatial information at the current moment and the historical information at the past moment are considered concurrently, and the required spatial-temporal information is obtained through a sparse variability attention mechanism in a self-adaptive mode, so that the accuracy of the aerial view feature at the current moment is improved.

Figure 4:
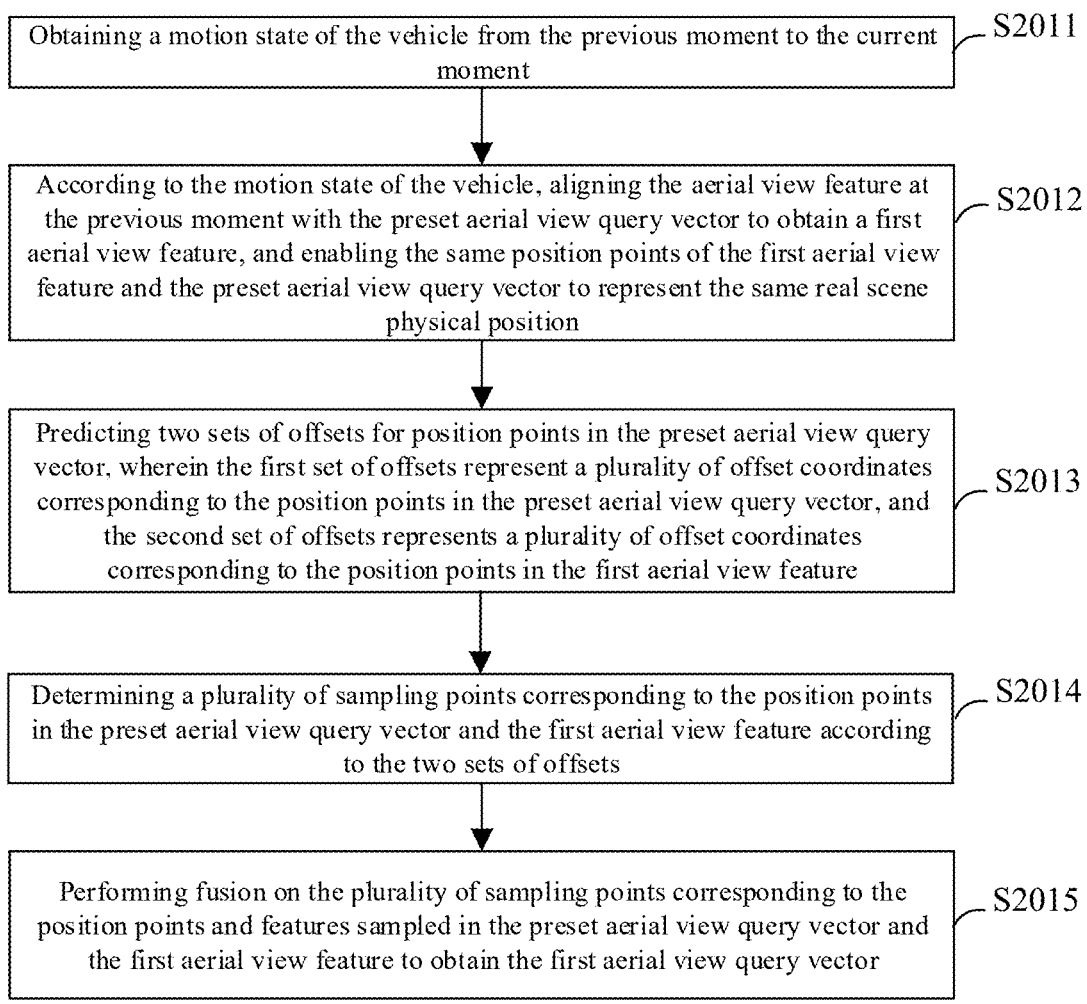
FIG. 4 is a flowchart illustrating optional steps of yet another image processing method provided in an embodiment of the present application.

In some embodiments, the S201 in FIG. 3 described above may be implemented by S2011-S2015. As shown in FIG. 4. FIG. 4 is a flowchart illustrating optional steps of yet another image processing method provided in an embodiment of the present application.

S2011. obtaining a motion state of the vehicle from the previous moment to the current moment.

Illustratively, an inertial measurement unit (IMU) of a vehicle may detect and measure acceleration and rotational motion of the vehicle. The current moment as moment t and the previous moment of the current moment as moment t−1 are taken as examples, the motion state of the vehicle from moment t−1 to moment t is obtained by the IMU of the vehicle, and the motion state may include, but is not limited to, rotation and translation of the vehicle at the previous and current moments, wherein the translation in the motion state may also be measured and obtained by global positioning system (GPS), which is not limited in the embodiments of the present application.

It should be noted that the difference 1 between the current moment and the previous moment of the current moment in the embodiment of the present application represents a time step, wherein the time step may be appropriately set by those skilled in the art according to an actual situation, for example, the time step may be 0.01 s, 0.1 s, 1 s or 5 s, which is not limited in the embodiments of the present application.

S2012. according to the motion state of the vehicle, aligning the aerial view feature at the previous moment with the preset aerial view query vector to obtain a first aerial view feature, and enabling the same position points of the first aerial view feature and the preset aerial view query vector to represent the same real scene physical position.

In the embodiment of the present application, according to the motion state information, the aerial view feature at the previous moment is aligned with the aerial view query vector at the current moment, so that the same positions of the two sets of features represent the same real-world physical position. For example, as the vehicle moves, the same position described above represents the position point of the intersection in the aerial view feature at the previous moment, and does not necessarily represent the same intersection in the aerial view query vector at the current moment, and the position points in the aerial view feature at the previous moment correspond to the position points in the aerial view query vector at the current moment by an alignment method such as rotation or movement, and the aerial view feature at the previous moment after alignment is represented as the first aerial view feature for the convenience of illustration.

It should be noted that, as the vehicle moves, some of the position points in the aerial view feature at the previous moment are not present in the aerial view query vector at the current moment, and the alignment refers to aligning the common position points of the two.

S2013. predicting two sets of offsets for position points in the preset aerial view query vector, wherein the first set of offsets represent a plurality of offset coordinates corresponding to the position points in the preset aerial view query vector, and the second set of offsets represents a plurality of offset coordinates corresponding to the position points in the first aerial view feature.

In the embodiment of the present application, since the corresponding position points in the preset aerial view query vector and the first aerial view feature represent the same real scene physical position, two sets of offsets may be predicted for the position points in the first aerial view feature.

It should be noted that a set of offsets comprise a plurality of offset coordinates (offset abscissa and offset ordinate), and one sampling point can be obtained according to a position point and its corresponding offset coordinate.

S2014. determining a plurality of sampling points corresponding to the position points in the preset aerial view query vector and the first aerial view feature according to the two sets of offsets.

In the embodiment of the present application, the temporal information is crucial for the visual system of the autonomous driving to understand the surrounding environment. In a still image (e.g., a plurality of view images) that does not comprise temporal information, it is difficult to infer the speed of a moving object or detect a highly-occluded object. The query at a location point (x, y) for the preset aerial view query vector corresponds to a certain location in the real world. There may be a moving object at this position, and the feature corresponding to the moving object may be located at any position around the position point (x, y) in the aerial view feature at the previous moment. If the feature corresponding to the moving object has been captured at the previous moment, the feature of the moving object at the previous moment still has a strong reference function at the current moment. Since the currently inputted plurality of view images do not contain temporal information, and it is unknown where the object located at the position point (x, y) corresponding to the real world position at the current moment is located at a specific position at the previous moment, there is no direct way to obtain the feature of the moving object at the previous moment. Subject to physical world rules, an object located at the location point (x, y) at the current moment may be located near the location point (x, y) at the previous moment. A plurality of sampling points can be obtained by sampling near the position point (x, y), which will cover the position of the object at the previous moment with a high probability.

S2015. performing fusion on the plurality of sampling points corresponding to the position points and features sampled in the preset aerial view query vector and the first aerial view feature to obtain the first aerial view query vector.

In the embodiment of the present application, according to the temporal self-attention mechanism, the required temporal information is obtained from the aerial view feature at the previous moment by using the preset aerial view query vector, and features of the plurality of sampling points corresponding to the same position point are fused to obtain the features of the position points, so that the first aerial view query vector is obtained.

In some embodiments, the sampling points include a first sampling point and a second sampling point, and the S2014 in FIG. 4 described above is implemented by the following: determining a plurality of first sampling points corresponding to the position points in the preset aerial view query vector according to the position points and the first set of offsets; and determining a plurality of second sampling points corresponding to the position points in the first aerial view feature according to the position points and the second set of offsets.

Figure 5:
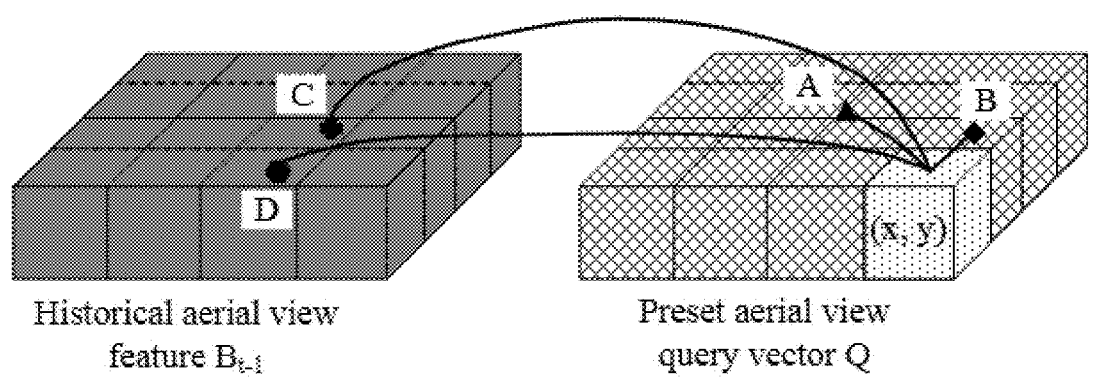
FIG. 5 is an exemplary schematic diagram illustrating a temporal self-attention mechanism provided in an embodiment of the present application.

Illustratively, as shown in FIG. 5, FIG. 5 is an exemplary schematic diagram illustrating a temporal self-attention mechanism provided in an embodiment of the present application. In FIG. 5, the aerial view query vector Q represents a preset aerial view query vector, the historical aerial view feature $B_{t-1}$ represents an aerial view feature at the previous moment, each set of offsets comprise two offset coordinates, and the historical aerial view feature Bit and the aerial view query vector Q each comprise a position point (x, y), and two first sample points (shown as A and B in FIG. 5) and two second sample points (shown as C and D in FIG. 5) are obtained by the position point (x, y) and the first set of offsets, and so on, and a plurality of sampling points corresponding to the position points can be obtained.

In some embodiments, the S2015 described above is implemented by S2015a-S2015d.

S2015a. determining first image features of the position points according to the plurality of first sampling points corresponding to the position points and the preset aerial view query vector.

In the embodiment of the present application, in a preset aerial view query vector, feature extraction is performed on a plurality of first sampling points corresponding to the position points to obtain features of the plurality of first sampling points, and the features of the plurality of first sampling points are used as a first image feature of the position point. The first image feature comprises spatial information under the aerial view.

In some embodiments, the S2015a described above may be implemented by the following: according to the plurality of first sampling points corresponding to the position points, extracting features from a preset aerial view query vector to obtain image features of the plurality of first sampling points corresponding to the position points; and according to preset weights of the plurality of first sampling points, fusing the image features of the plurality of first sampling points corresponding to the position points to obtain the first image features of the position points.

In the embodiment of the present application, the importance degree of each first sampling point to the corresponding position point is different, so that the weighted fusion is performed on the image features of the plurality of first sampling points by combining the preset weights of the first sampling points to obtain the first image feature of the position point, and the accuracy of the first image feature is improved.

It should be noted that the preset weight may be set by those skilled in the art according to actual conditions, as long as the importance degree of the sampling point to the corresponding location point can be embodied, which is not limited in the embodiment of the present application.

S2015b. determining second image features of the position points according to the plurality of second sampling points corresponding to the position points and the first aerial view feature.

In the embodiment of the present application, in the first aerial view feature, the feature extraction is performed on a plurality of second sampling points corresponding to the position points to obtain features of the plurality of second sampling points, and the features of the plurality of second sampling points are used as the second image feature of the position point. The second image feature comprises history information (temporal information).

In some embodiments, the S2015b described above may be implemented by the following: extracting features from the first aerial view feature according to the plurality of second sampling points corresponding to the position points to obtain image features of the plurality of second sampling points corresponding to the position points; and performing fusion on the image features of the plurality of second sampling points corresponding to the position points according to preset weights of the plurality of second sampling points to obtain the second image features of the position points.

In the embodiment of the present application, the importance degree of each second sampling point to the position point is different, so that the weighted fusion is performed on the image features of the plurality of second sampling points by combining the preset weights of the second sampling points to obtain the second image feature of the position point, and the accuracy of the second image feature is improved.

S2015c. performing fusion on the first image features of the position points and the second image features of the position points to obtain the fused features of the position points.

S2015d. taking the fused features of the position points as the first aerial view query vector.

In the embodiment of the present application, after weighted fusion features (i.e., the first image feature and the second image feature) of the location points in the first aerial view feature and the preset aerial view query vector are extracted, the fused features of the first image feature and the second image feature are taken as the first aerial view query vector.

In the embodiment of the present application, two sets of offsets are predicted by using the first serial view feature at the position point (x, y), wherein one set of offsets are acted on the first aerial view feature, and the other set of offsets are acted on the preset aerial view query vector. With the location point (x, y) as the center, a set of offset coordinates can be used to obtain a sampling point. According to a plurality of sampling points corresponding to the position points (x, y), the features near the sampling points are densely sampled, and each sampling point is given different weights. By performing weighted fusion at the positions of all sampling points, the corresponding spatial-temporal information at the position point (x, y) can be obtained, and the spatial-temporal information comprises historical information and spatial information under the aerial view, so that a first aerial view query vector is obtained, and the accuracy of the first aerial view query vector is improved.

In some embodiments, the image processing method further comprises how to obtain an aerial view feature at an initial moment. The aerial view query vector at the initial moment is taken as the aerial view feature at the initial moment; an initial temporal information is extracted from the aerial view feature at the initial moment according to the aerial view query vector at the initial moment, initial spatial information are extracted from a plurality of view image features corresponding to the initial moment, and the initial temporal information and the initial spatial information are combined to generate the aerial view feature at the initial moment; wherein the aerial view feature at the initial moment is configured to perform prediction on an aerial view feature at a next moment.

In the embodiment of the present application, the aerial view feature at the current moment may be an aerial view feature at any moment, that is, the process of determining the aerial view feature at each moment is similar, and only the inputs (images at a plurality of views, aerial view features at the previous moment of the current moment) are different. Since the aerial view feature at the previous moment is not present at the initial moment, it is necessary to explain a process for determining the aerial view feature at the initial moment. Before introducing the aerial view feature at the initial moment, the process of determining the aerial view feature at any moment will be described.

Figure 6:
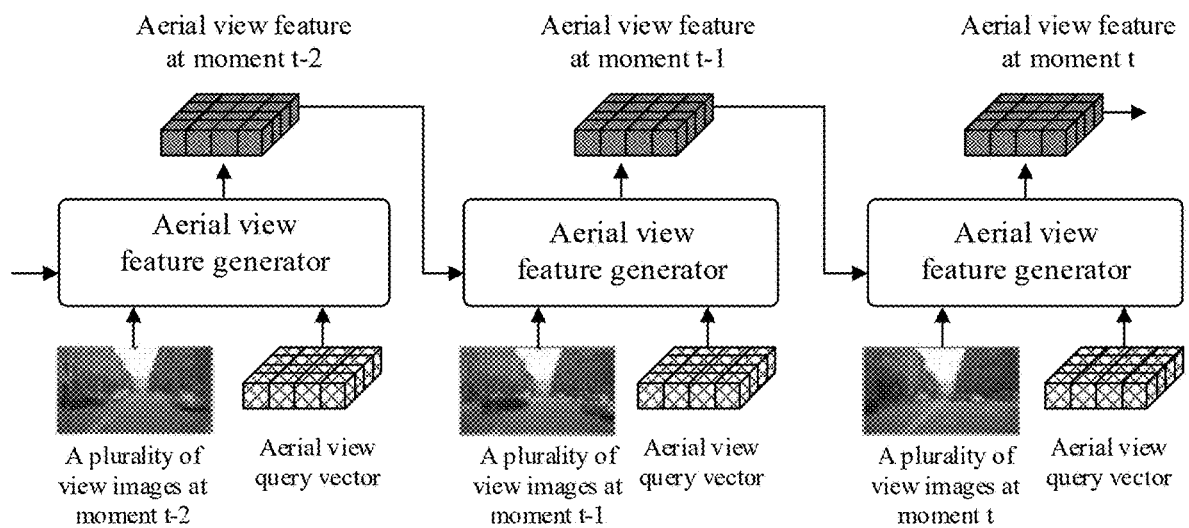
FIG. 6 is an exemplary schematic diagram illustrating a cyclical generation of an aerial view feature provided in an embodiment of the present application.

Illustratively, as shown in FIG. 6. FIG. 6 is an exemplary schematic diagram illustrating a cyclical generation of an aerial view feature provided in an embodiment of the present application. Based on an aerial view feature generator, spatial information extraction is performed on the plurality of view image features corresponding to the plurality of view images by using the aerial view query vector (see the description of S202 in FIG. 3 described above), temporal information extraction is performed on the aerial view feature at the previous moment (see the description of S201 in FIG. 3 described above), and then the spatial information and the temporal information are fused to generate the aerial view feature at the current moment. The aerial view feature generator in FIG. 6 can be understood as a machine learning model, and can be any suitable neural network (NN) model that can be used for spatial information extraction and temporal information extraction. The embodiment of the present application does not limit the specific structure of the aerial view feature generator, and includes but is not limited to: a convolutional recurrent neural network (CRNN), a convolutional neural network (CNN), and the like.

In the embodiment of the present application, the structure of the aerial view feature generator may comprise a self-attention layer and a feed-forward network (FFN). The self-attention layer comprises a spatial cross-attention mechanism suitable for extracting spatial information and a temporal self-attention mechanism suitable for extracting temporal information, which are proposed based on the variability attention mechanism. For the specific structure of the generator, reference may be made to a codec structure of the Transformer or a codec structure of the Deformable DETR (Deformable Transformers for end-to-end object detection) network, which is not described herein again.

In the embodiment of the present application, FIG. 6 is a schematic diagram illustrating a cyclic generation of an aerial view feature, in which the aerial view feature generated at each moment is interacted with the aerial view feature generated at the previous moment, and FIG. 6 shows a generation process of the aerial view feature at moment t−2, moment t−1, and moment t. The process of generating the aerial view feature at moment t−1 is taken as an example, based on the aerial view feature generator, spatial information extraction is performed on a plurality of view image features corresponding to a plurality of view images (illustrated as one image in FIG. 6, and including a plurality of view images in practical applications) at moment t by using the aerial view query vector at moment t (see the description of S202 in FIG. 3 described above), temporal information extraction is performed on the aerial view feature at moment t−2 (see the description of S201 in FIG. 3 described above), and then the spatial information and the temporal information are fused to generate the aerial view feature at moment t−1. The aerial view feature at moment t−1 is used to predict the aerial view feature at moment t, and the aerial view feature at moment t is used to predict the aerial view feature at moment t+1 (not shown in FIG. 6), which is not described herein again, and similarly, the prediction of the aerial view feature at moment t−2 needs to use the aerial view feature at moment t−3 (not shown in FIG. 6).

In the embodiment of the present application, when the aerial view feature at the initial moment is determined, the aerial view query vector at the initial moment is used as the aerial view feature at the initial moment, and other steps are the same as the steps of determining the aerial view feature at any moment in FIG. 6 described above, and only the inputs are different, which are not described herein again. Through the thought similar to the cyclic neural network, the model can be used for modeling for a long time without increasing extra burden, so that the accuracy of the aerial view feature can be improved, and the image processing efficiency is also improved.

Figure 7:
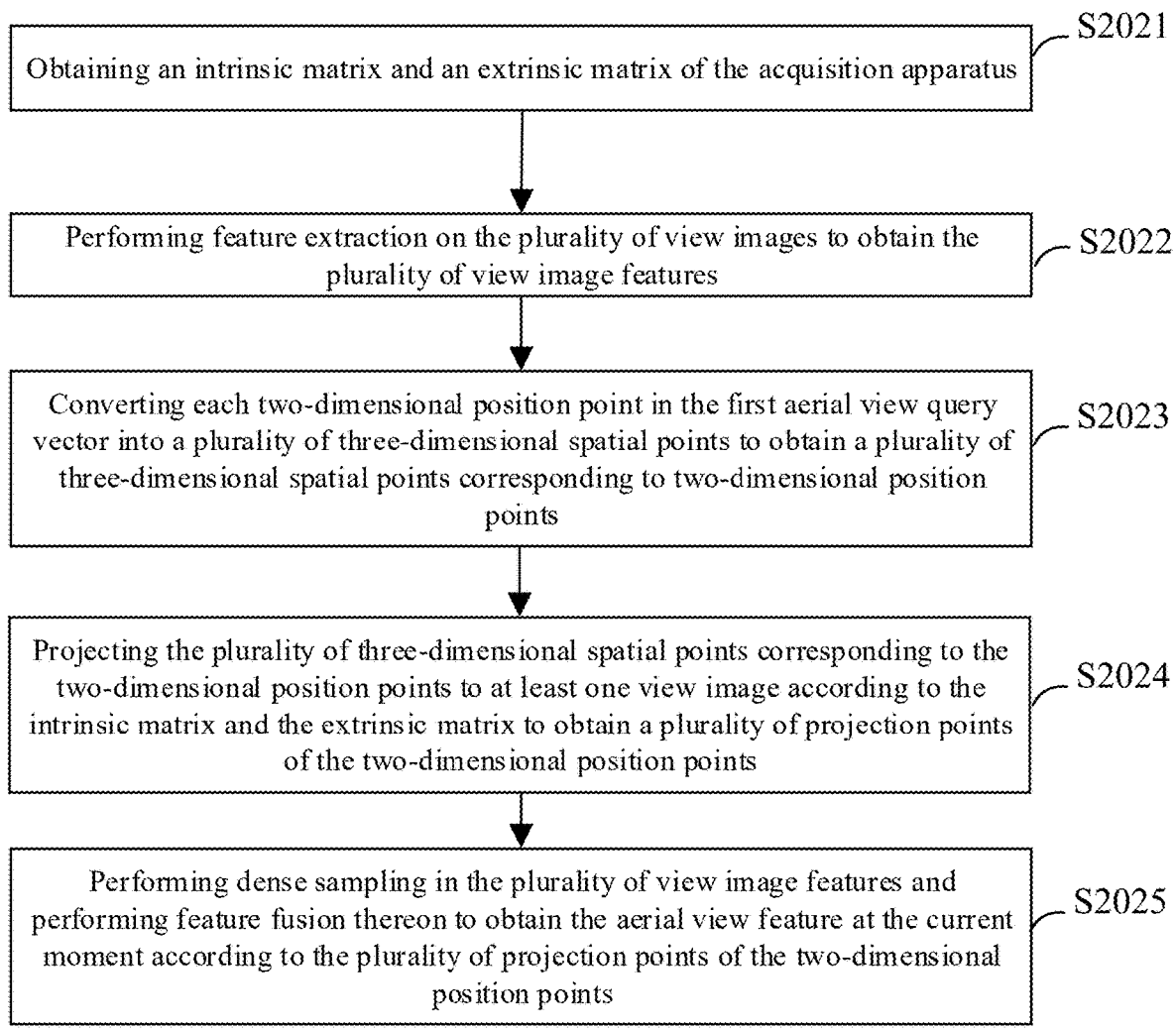
FIG. 7 is a flowchart illustrating optional steps of still another image processing method provided in an embodiment of the present application.

In some embodiments, the S202 in FIG. 3 described above may further be implemented by S2021-S2025. As shown in FIG. 7, FIG. 7 is a flowchart illustrating optional steps of still another image processing method provided in an embodiment of the present application.

S2021. obtaining an intrinsic matrix and an extrinsic matrix of the acquisition apparatus.

In the embodiment of the present application, the process of camera imaging (i.e., the camera imaging principle) is the transformation of three-dimensional space coordinates into two-dimensional image coordinates, which is a projection process. A camera parameter matrix is to establish a three-dimensional to two-dimensional projection relationship. The camera parameter matrix comprises an intrinsic matrix and an extrinsic matrix, wherein the intrinsic matrix is related to the camera and comprises a focal length, a principal point coordinate position relative to an imaging plane, a coordinate axis inclination parameter and a distortion parameter, the intrinsic matrix reflects the attributes of the cameras, and the intrinsic matrices of the cameras are different. The extrinsic matrix depends on a position of the camera in the world coordinate system and includes a rotation matrix and a translation matrix, which together describe how to convert points from the world coordinate system to the camera coordinate system. The rotation matrix describes an orientation of the coordinate axis of the world coordinate system relative to the coordinate axis of the camera coordinate system, and the translation matrix describes a position of the spatial origin in the camera coordinate system. There may be a plurality of acquisition apparatuses that are arranged at different positions on the vehicle to acquire a plurality of view images.

S2022. performing feature extraction on the plurality of view images to obtain the plurality of view image features.

In the embodiment of the present application, when the feature extraction is performed on the view images, the feature extraction can be performed through a feature extraction network. The feature extraction network may be a backbone network ResNet of a convolutional neural network (CNN), including but not limited to ResNet50, ResNet101, ResNet152, Res2Net and the like. The feature extraction network may also be a backbone network VoVNet and the like, which is not limited in the embodiment of the present application.

Figure 8:
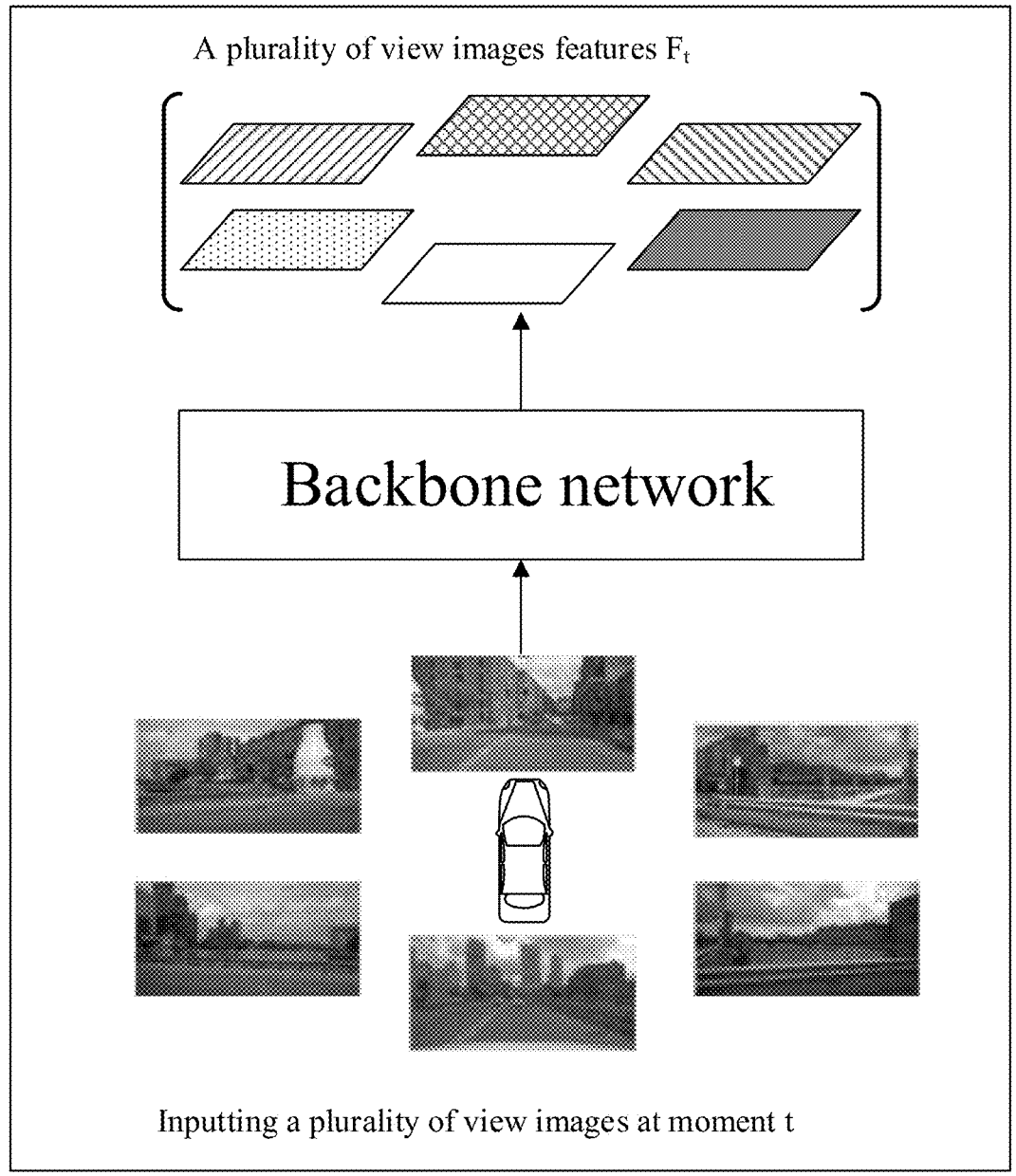
FIG. 8 is an exemplary schematic diagram illustrating an extraction of a view image feature provided in an embodiment of the present application.

Illustratively, as shown in FIG. 8, FIG. 8 is an exemplary schematic diagram illustrating an extraction of a view image feature provided in an embodiment of the present application. An execution subject (for example, an image processing apparatus) of the image processing method obtains a plurality of view images from a multi-view camera at each moment, and performs feature extraction on the plurality of view images at the moment t by using a backbone network to obtain a plurality of view image features Fr. The backbone network in this example is typically pre-trained on large-scale datasets, such as ImageNet, to migrate well into downstream tasks.

In the embodiment of the present application, feature extraction is performed on the view images to obtain a plurality of view image features, wherein the plurality of view image features represent image features corresponding to the view images.

S2023. converting each two-dimensional position point in the first aerial view query vector into a plurality of three-dimensional spatial points to obtain a plurality of three-dimensional spatial points corresponding to two-dimensional position points.

In the embodiment of the present application, in addition to obtaining the temporal information from the aerial view feature at the previous moment, it is necessary to obtain the spatial information from a plurality of currently input view images.

Figure 9:
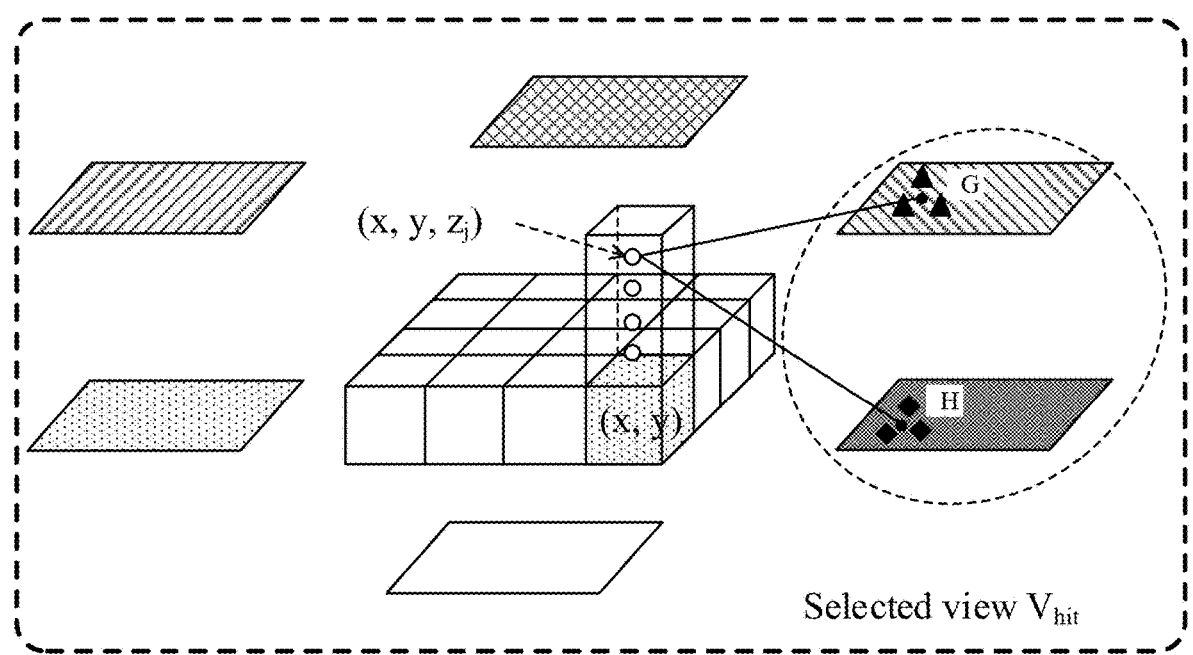
FIG. 9 is an exemplary schematic diagram illustrating a spatial cross-attention mechanism provided in an embodiment of the present application.

Illustratively, as shown in FIG. 9, FIG. 9 is an exemplary schematic diagram illustrating a spatial cross-attention mechanism provided in an embodiment of the present application; the two-dimensional location points are location points in a two-dimensional plane (xoy plane) under the aerial view, and for each aerial view query vector at the location point (x, y), it is responsible for capturing objects in a certain range in the real world. However, the inputted plurality of view images are two-dimensional images and do not contain three-dimensional coordinate information. Therefore, in order to obtain the required spatial information from the two-dimensional image, it is necessary to convert each aerial view query vector at the position point (x, y) into a three-dimensional spatial point on a three-dimensional space. For each position point, a set of preset height values ($z_1, z_2, z_3, z_4 \ldots$) on the z axis is used, so that each position point (x, y) can obtain a set of three-dimensional spatial points located on a three-dimensional space, wherein the set of three-dimensional spatial points may comprise (x, y, $z_1$), (x, y, $z_2$), (x, y, $z_3$), (x, y, $z_4$) and the like, in FIG. 9, the three-dimensional spatial point is represented by (x, y, $z_j$), wherein j represents different heights, and in FIG. 9, it is only illustrated by taking each set of three-dimensional spatial points including four as an example.

It should be noted that the preset height value in the z axis used in FIG. 9 may be set by those skilled in the art according to actual conditions, in general, the maximum value of the height of the object on the road is about 4 m, and the preset height value in the z axis may be set to 1 m, 2 m, 3 m, 4 m and the like; the specific parameters of the height value and the number of the plurality of three-dimensional spatial points corresponding to each two-dimensional position point are not limited in the embodiment of the present application.

S2024. projecting the plurality of three-dimensional spatial points corresponding to the two-dimensional position points to at least one view image according to the intrinsic matrix and the extrinsic matrix to obtain a plurality of projection points of the two-dimensional position points.

In the embodiment of the present application, before explaining the projection process, the camera imaging principle is described. The camera has four coordinate systems, namely a world coordinate system (world), a camera coordinate system (camera), an image coordinate system (image) and a pixel coordinate system (pixel), and the camera imaging process is a process of the world coordinate system-the camera coordinate system-the image coordinate system-the pixel coordinate system. The extrinsic matrix is a description (or a position posture) of the world coordinate system in the camera coordinate system, and can be understood as a description for interconversion between the world coordinate system and the camera coordinate system, the intrinsic matrix is used for interconversion between the camera coordinate system and the image coordinate system, and the image is measured in pixels, so that the image coordinate system also needs to be converted into a pixel coordinate system, which is the camera imaging principle.

In the embodiment of the present application, a plurality of three-dimensional spatial points can be projected onto a two-dimensional image (i.e., a plurality of view images) through an intrinsic matrix and an extrinsic matrix by using a camera imaging principle, that is, a plurality of projection points of the plurality of three-dimensional spatial points on different view images are obtained, so that conversion from the three-dimensional spatial points to the projection points on the two-dimensional image is completed.

S2025. performing dense sampling in the plurality of view image features and performing feature fusion thereon to obtain the aerial view feature at the current moment according to the plurality of projection points of the two-dimensional position points.

In the embodiment of the present application, since the acquisition apparatuses are distributed at various angles of the vehicle, that is, the acquisition apparatuses at different positions have different views, these three-dimensional spatial points are projected to only a few views. That is, the plurality of projection points of each two-dimensional position point are not distributed on the plurality of view images, for example, three-dimensional spatial points located in front of the vehicle are projected on the images captured by the front-view camera, and may be projected on the images captured by the left front-view camera and the right front-view camera, but not projected on the images captured by the rear-view camera, the left rear-view camera and the right rear-view camera.

In the embodiment of the present application, for each two-dimensional position point, since the corresponding plurality of three-dimensional spatial points are only projected to a few views, feature interaction is only performed at a few views. Limited by the accuracy of the camera parameters (i.e., the intrinsic matrix and extrinsic matrix), the feature receptive field of the projection point is limited. In the embodiment of the present application, a sparse variability attention mechanism can be adopted to perform feature extraction, the projection point is taken as the center, and the surrounding features are subjected to dense sampling, so that the projection point error caused by inaccurate camera parameters can be solved, the features of a larger receptive field can be obtained, and the accuracy of the aerial view feature at the current moment is improved.

In the embodiment of the present application, for each two-dimensional position point, a plurality of preset height values are added to each two-dimensional position point, and the two-dimensional position point is converted into a plurality of three-dimensional spatial points; and the plurality of three-dimensional spatial points are projected onto at least one view image by combining the intrinsic matrix and the extrinsic matrix, and dense sampling and feature fusion are performed on the plurality of view image features to obtain the aerial view feature at the current moment, so that the accuracy of the aerial view feature at the current moment is improved.

In some embodiments, the S2025 in FIG. 7 described above may further include S2025a-S2025d.

S2025a. determining, for each two-dimensional position point, sampling ranges corresponding to the projection points according to position information of the projection points.

In some embodiments, the S2025a described above may further be implemented by the following two examples.

Example I. determining geometric ranges formed by taking the projection points as centers as sampling ranges corresponding to the projection points.

Example II. determining a plurality of acquisition points of the projection points within preset ranges of the projection points; and taking the plurality of acquisition points of the projection points as sampling ranges corresponding to the projection points.

In the embodiment of the present application, for each projection point, a geometric range of the projection point may be determined by taking the projection point as a center and a preset distance as a radius, and the geometric range is used as an acquisition range of the projection point. It should be understood that the geometric range is not limited to a regular circle, but may also be a square, an irregular figure and the like, and the embodiment of the present application is only described by taking a circle as an example, which does not mean that the embodiment of the present application is limited thereto. Feature extraction is performed on points in the geometric range (including the projection point) to obtain the image features of the projection point.

In the embodiment of the present application, for each projection point, several acquisition points may be acquired around the projection point, and feature extraction may be performed on the projection point and the several acquisition points corresponding to the projection point to obtain an image feature of the projection point.

In the embodiment of the present application, according to the above two examples, the dense sampling in S2025 described above may be to sample around the projection point, or to acquire some acquisition points around the projection point, which is not limited in the embodiment of the present application.

In the embodiment of the present application, the sampling range of the projection point is determined in a geometric range formed by taking the projection point as a center or in a mode of a plurality of acquisition points, so that the diversity of dense sampling is improved.

S2025b. performing sampling in the view image features corresponding to the projection points according to the sampling ranges corresponding to the projection points to obtain image features of the projection points.

S2025c, performing fusion on image features of the projection points corresponding to the same two-dimensional position point to obtain image features of the two-dimensional position points.

S2025d. performing fusion on image features of the plurality of two-dimensional position points to obtain the aerial view feature at the current moment.

In the embodiment of the present application, for each projection point of each two-dimensional position point, dense sampling is performed on the view image feature corresponding to an image of a view in which the projection point is located according to a sampling range corresponding to the projection point, so as to obtain the image feature of the projection point. For each two-dimensional position point, the image features of the plurality of projection points of the two-dimensional position point are fused to obtain the image feature of the two-dimensional position point, and the image features of the plurality of two-dimensional position points are taken as the aerial view features at the current moment.

Illustratively, as shown in FIG. 9, it is illustrated in FIG. 9 by taking one two-dimensional location point corresponding to four three-dimensional spatial points, and an acquisition range of the projection point comprising a projection point and a plurality of acquisition points as examples, and the three-dimensional spatial point with the largest height value is projected onto images captured by the front right camera and the rear right camera, i.e., the selected view $V_{hit}$, to obtain two projection points, which are shown as G and H in FIG. 9. Three acquisition points are acquired around the projection point G, and three acquisition points are acquired around the projection point H. The three acquisition points acquired around the projection point G and the image feature of the projection point G are fused to obtain the image feature of the projection point G; and the three acquisition points acquired around the projection point H and the image feature of the projection point H are fused to obtain the image feature of the projection point H.

In the embodiment of the present application, the sampling range of the projection points is supplemented by the position information of the projection points, so that the feature extraction is realized by adopting a sparse variability attention mechanism; compared with a scheme of performing the feature extraction only according to the projection points, the surrounding features are densely sampled by taking the projection points as the center, so that the accuracy of the image features of the projection points is improved. Therefore, the aerial view feature at the current moment is determined according to the image features of the plurality of projection points of the two-dimensional position points, and the accuracy of the aerial view feature at the current moment is improved.

In some embodiments, the S201-S203 in FIG. 3 described above may further be implemented by the following: performing feature sampling and fusion on the same position points in the preset aerial view query vector and the aerial view feature at the previous moment, and combining the preset aerial view query vector to obtain a first aerial view query vector; performing, in the plurality of view image features, feature sampling and fusion on projection points on the plurality of view images converted from two-dimensional position points in the first aerial view query vector, and combining the first aerial view query vector to obtain a target aerial view query vector; and performing preset information reinforcement on the target aerial view query vector, and combining the target aerial view query vector to obtain the aerial view feature at the current moment.

In the embodiment of the present application, residual connection is performed on the features obtained by sampling and fusing the features of the same position points and a preset aerial view query vector to obtain a first aerial view query vector. When the first aerial view query vector is obtained, the features obtained by sampling and fusing the features of the same position points are considered, and a preset aerial view query vector is combined, wherein the preset aerial view query vector is used for reserving original information, and compared with a scheme that the features obtained by sampling and fusing the features of the same position points are directly used as the first aerial view query vector, the accuracy of the first aerial view query vector is improved. Similarly, the residual connection is performed on the features obtained by sampling and fusing the projection point features and the first aerial view query vector to obtain a target aerial view query vector. The first aerial view query vector is combined with the target aerial view query vector to retain the original information and improve the integrity of the information, thereby improving the accuracy of the target aerial view query vector.

In the embodiment of the present application, when the first aerial view query vector is obtained, a plurality of first sampling points in the preset aerial view query vector and a plurality of second sampling points in the aerial view feature at the previous moment are used, and the first sampling points and the second sampling points are obtained according to the position points and the offset and are estimated, so that the sampling points may have errors, that is, the image features of some sampling points may be inaccurate. When the target aerial view query vector is obtained, a plurality of three-dimensional spatial points obtained by increasing the height value and a sampling range (a geometric range or a plurality of acquisition points) of a plurality of projection points are used, and the three-dimensional spatial points and the sampling range are estimated, so that errors can exist in the plurality of projection points corresponding to the three-dimensional spatial points and the sampling range of the projection points.

In the embodiment of the present application, the preset information reinforcement and interference information filtration are further performed on the target aerial view query vector through a feed-forward neural network, so that the aerial view feature at the current moment is obtained, wherein the preset information represents information with reference significance for perception task processing or the aerial view feature, and the interference information represents information (redundant sampling points, redundant acquisition points and the like) which does not contribute to perception task processing or the aerial view feature. The preset information reinforcement is performed on the target aerial view query vector through a feed-forward neural network, so that the accuracy of the aerial view feature at the current moment is improved.

In some embodiments, the S103 in FIG. 1 described above may further be implemented by the following: performing prediction on at least two perception tasks according to the aerial view feature at the current moment to obtain at least two perception task results; wherein the perception tasks comprise a three-dimensional target detection task, a map instance segmentation task, a driving track planning task and a lane line position detection task.

Illustratively, the perception task as a three-dimensional target detection task is taken as an example, the three-dimensional target detection is performed based on the aerial view feature, and the accuracy of the aerial view feature is required to be higher in the three-dimensional target detection, so that the accuracy of the aerial view feature directly affects the accuracy of the processing result of the subsequent perception task. In the embodiment of the present application, a sparse variability attention mechanism is utilized to simultaneously perform a fusion algorithm of spatial and temporal information, and an idea similar to a recurrent neural network is used when the temporal information is fused, so that the aerial view features are fused with the aerial view features at a plurality of historical moments, and the accuracy of the aerial view features is improved. Then, the same aerial view feature supports a plurality of perception tasks simultaneously, and the perception task results are consistent, so that the accuracy of the perception tasks is improved, and the processing efficiency of the perception tasks is improved.

Figure 10:
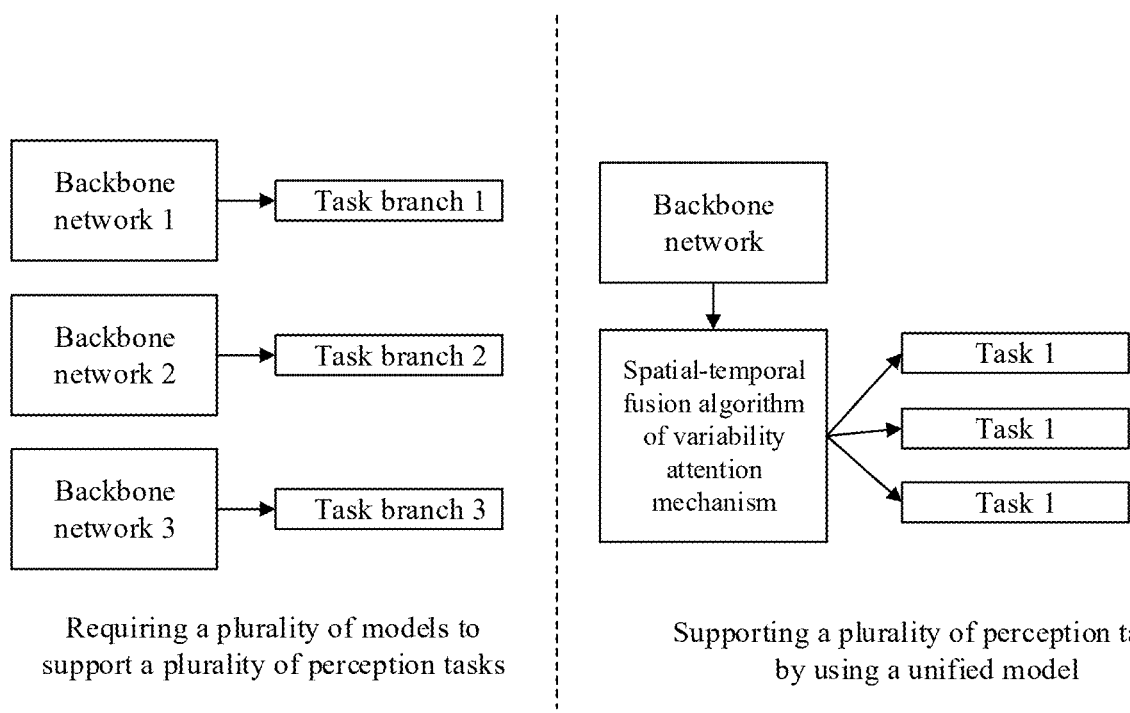
FIG. 10 is an exemplary schematic diagram of a perception algorithm provided in an embodiment of the present application.

Illustratively, as shown in FIG. 10, FIG. 10 is an exemplary schematic diagram of a perception algorithm provided in an embodiment of the present application. FIG. 10 shows a scheme requiring a plurality of models to support a plurality of perception tasks and a scheme supporting a plurality of perception tasks using a unified model. For a scheme requiring a plurality of models to support a plurality of perception tasks, there is a separate model for each perception task; illustratively, the separate model required by task 1 comprises a backbone network 1 and a task branch 1 (which may be a convolution header), the separate model required by task 2 comprises a backbone network 2 and a task branch 2 (which may be a convolution header), and the separate model required by task 3 comprises a backbone network 2 and a task branch 2 (which may be a convolution header), and three tasks need separate processing, which reduces the processing efficiency of the perception tasks.

The embodiment of the present application provides a scheme supporting a plurality of perception tasks by using a unified model, the plurality of view image features are obtained through a backbone network, the aerial view features are obtained through a spatial-temporal fusion algorithm of a variability attention mechanism, the plurality of perception tasks can be simultaneously supported, the plurality of perception tasks are shown as tasks 1, 2 and 3 in FIG. 10, and the plurality of perception tasks may include, but are not limited to, any two or more than two of a three-dimensional target detection task, a map instance segmentation task, a driving track planning task and a lane line position detection task. The perception task processing may be performed by a decoder, which may comprise a plurality of convolution heads for different perception task processing, and the decoder has a function of decoding the aerial view feature according to perception task content.

In the embodiment of the present application, the three-dimensional target detection branch and the map semantic segmentation branch based on the aerial view feature can perform corresponding perception tasks based on the aerial view feature generated by the backbone network in FIG. 10 and the spatial-temporal fusion algorithm of the variability attention mechanism, and models for processing different perception tasks can be realized only by adding a lightweight task convolution head. A plurality of perception tasks are supported while most of networks are shared, so that the training and reasoning burden of the deep learning model is greatly reduced.

An application scenario in the embodiment of the present application is described below with a specific example.

Figure 11:
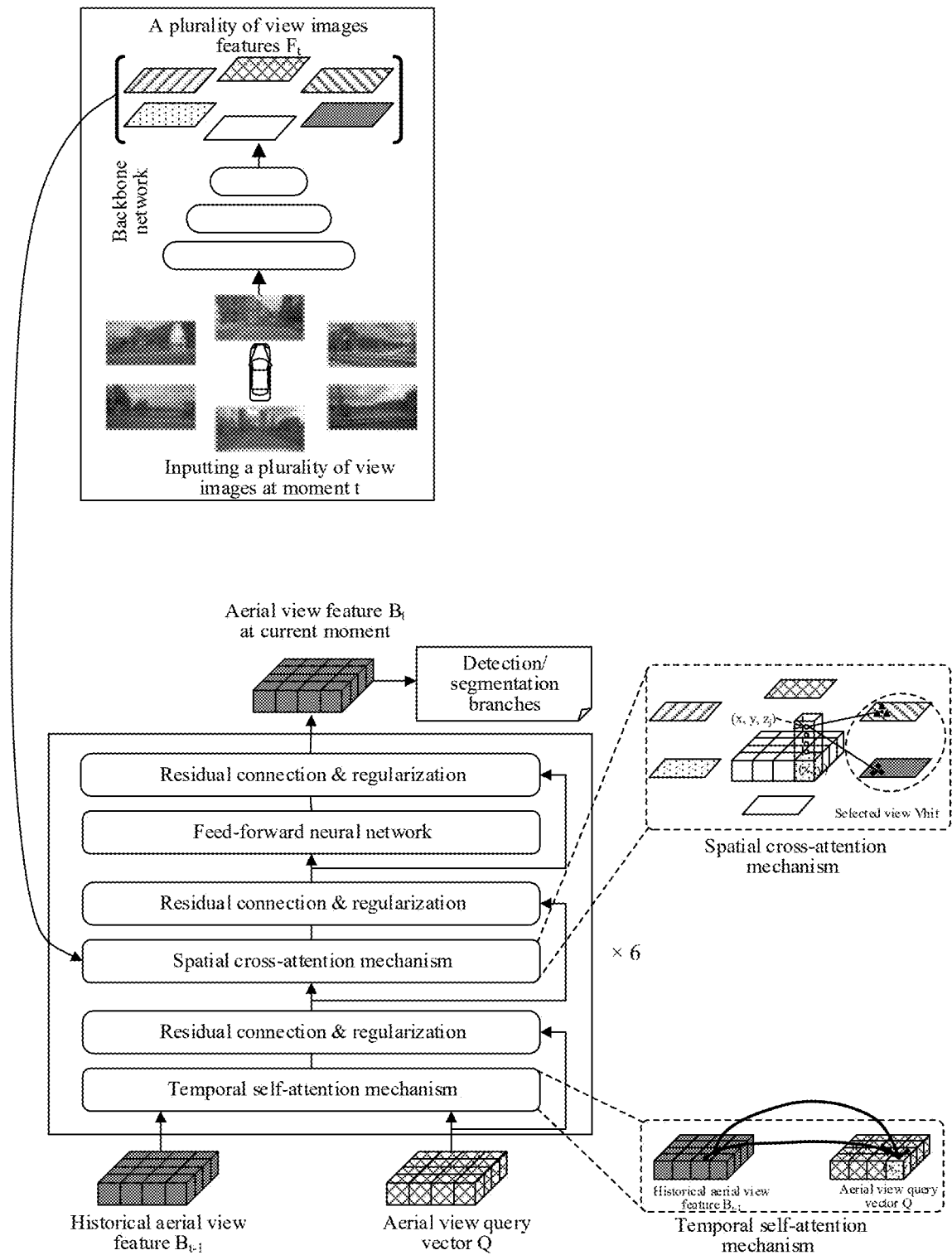
FIG. 11 is an optional structural schematic diagram of an aerial view generator provided in an embodiment of the present application.

In the embodiment of the present application, the aerial view feature at the previous moment is historical aerial view feature $B_{t-1}$, the preset aerial view query vector is aerial view query vector Q as an example, as shown in FIG. 11, and FIG. 1l is an optional structural schematic diagram of an aerial view generator provided in an embodiment of the present application.

Illustratively, the historical aerial view feature $B_{t-1}$ and the aerial view query vector Q are inputted into the aerial view feature generator, and after a temporal self-attention mechanism, residual connection and regularization (shown by residual connection & regularization in FIG. 11) are performed on the extracted temporal information in combination with aerial view query vector Q to obtain a first aerial view query vector, wherein the regularization is performed on the residual-connected features, for example, the average value is 0 and the variance is 1, and the aerial view query vector Q is inputted here to retain original information. Then, the first aerial view image query vector and the plurality of view image features are subjected to a spatial cross-attention mechanism, and the extracted spatial information are combined with the first aerial view image query vector to be subjected to residual connection and regularization, so that a target aerial view image query vector is obtained; the purpose of the first aerial view query vector inputted here is to keep the original information, which is the same as the purpose of the aerial view query vector Q inputted when the residual connection is performed. The target aerial view query vector is inputted into a feed-forward neural network, the interference information filtration or preset information reinforcement is performed on the target aerial view query vector, the feature after the interference information filtration or preset information reinforcement is combined with the target aerial view query vector to be subjected to residual connection and regularization, and the aerial view feature B: at the current moment is outputted. It should be noted that the above processes of extracting the temporal informations, performing residual connection on the aerial view query vector Q, extracting the spatial informations, performing residual connection on the first aerial view query vector, performing preset information reinforcement and performing residual connection on the target aerial view query vector can be performed many times, and in the figure, the process is described by 6 times, and the accuracy of the aerial view feature can be improved by the plurality of extraction and fusion steps. The aerial view query vector Q still exists in the process of generating the aerial view feature, information in the C-dimension of the aerial view query vector Q is changed in each feature extraction or fusion step, and the aerial view query vector that is finally output is the aerial view feature in which the spatial information at the current moment and the historical temporal information at the previous moment are fused.

In the embodiment of the present application, after the aerial view feature B; at the current moment is obtained, the processing of the perception task may be performed through a detection branch or a segmentation branch, and the implementation process may be referred to the description of FIG. 10. The implementation process of the plurality of view image features in FIG. 11 can be referred to the description of FIG. 8, the implementation process of the spatial cross-attention mechanism in FIG. 1l can be referred to the description of FIG. 9, and the implementation process of the temporal self-attention mechanism in FIG. 11 can be referred to the description of FIG. 5. These implementation process is not described herein again.

In the embodiment of the present application, a set of preset learnable parameters is used for representing the aerial view query vector Q. and the aerial view query vector Q is sequentially interacted with the spatial information and the temporal information, so that the spatial-temporal information are uniformly fused. The temporal information is obtained from the historical the aerial view feature by using a temporal self-attention mechanism; the spatial information is obtained from the plurality of view image features by using a spatial cross-attention mechanism (an adaptive attention mechanism), so that the aerial view feature at the current moment is obtained. Based on the aerial view feature fused with the spatial-temporal information, various autonomous driving perception tasks can be simultaneously supported, the computational burden of a perception algorithm is reduced, and the processing efficiency of the perception tasks is improved when reasoning or prediction (the detection branch or the segmentation branch in FIG. 11) is performed according to the aerial view feature.

Figure 12A:
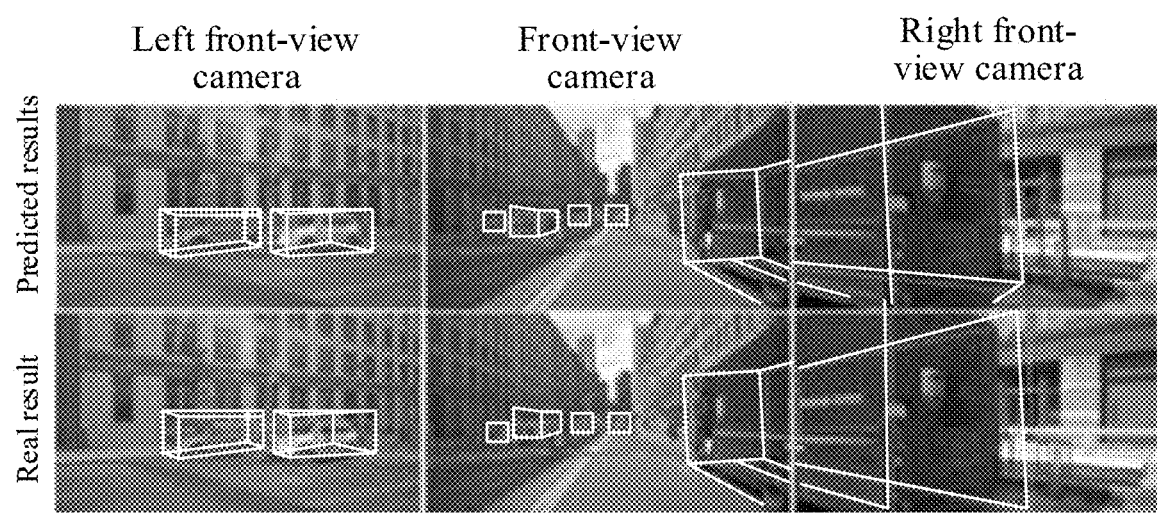
FIG. 12A is an exemplary schematic diagram illustrating a visualization result of a plurality of perception tasks provided in an embodiment of the present application.
Figure 12B:
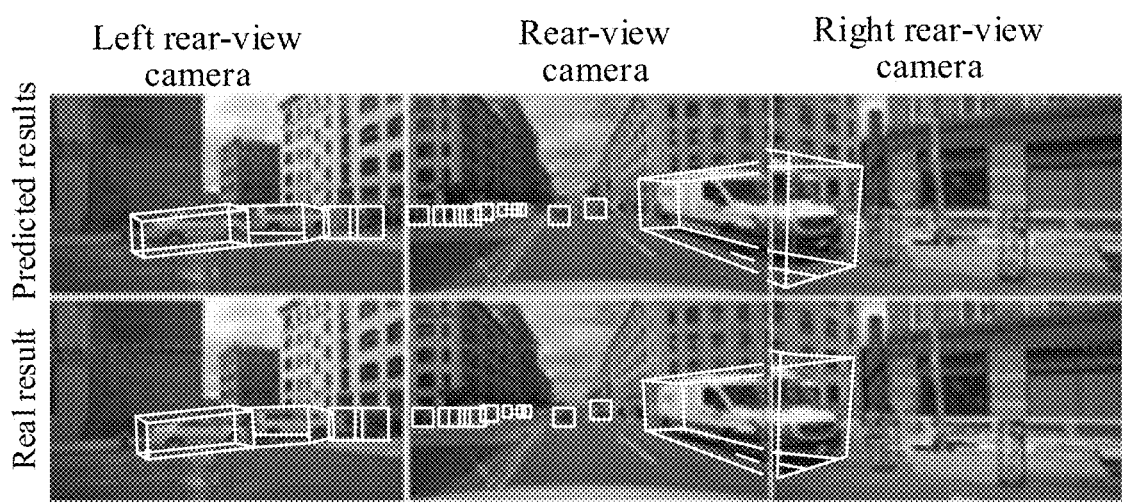
FIG. 12B is an exemplary schematic diagram illustrating another visualization result of a plurality of perception tasks provided in an embodiment of the present application.
Figure 12C:
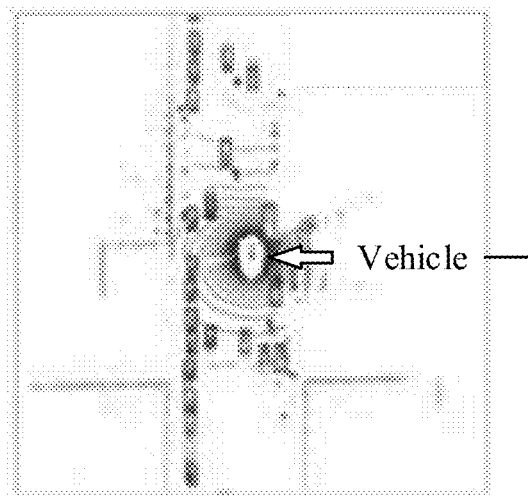
FIG. 12C is an exemplary schematic diagram illustrating another visualization result of a plurality of perception tasks provided in an embodiment of the present application.
Figure 12C:
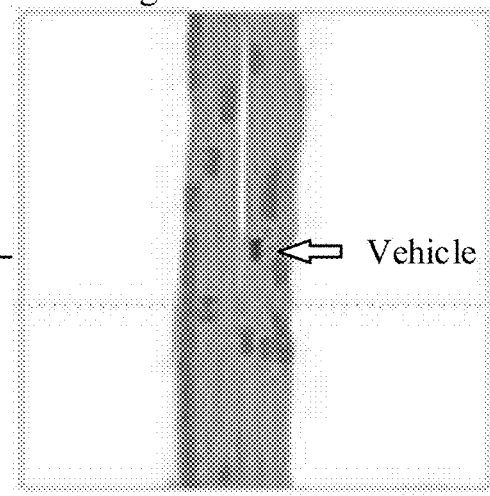

Illustratively, based on the aerial view generator provided in FIG. 11, a plurality of perception task processes may be performed according to the obtained aerial view feature to obtain visual perception task results, as shown in FIGS. 12A to 12C, wherein FIGS. 12A to 12C are exemplary schematic diagrams illustrating a visualization result of a plurality of perception tasks provided in an embodiment of the present application. FIG. 12A shows real results and predicted results of view images captured by the left front-view camera, the front-view camera and the right front-view camera, and FIG. 12B shows real results and predicted results of view images captured by the left rear-view camera, the rear-view camera and the right rear-view camera; it can be seen from FIGS. 12A and 12B, the real results and predicted results are very close to each other, which illustrates that the image processing method provided in the embodiment of the present application achieves a very good effect.

Illustratively, FIG. 12C also shows the three-dimensional object detection result and the map semantic segmentation result under the aerial view, and FIG. 12C shows the three-dimensional object detection result under the aerial view because the track planning is taken as an example when the three-dimensional object detection result is used for subsequent decision-making, the physical collision between the vehicle and other objects needs to be avoided, and the position overlapping on the two-dimensional plane under the aerial view (top view) is substantially considered. Due to the same aerial view feature adopted, it can be seen from FIG. 12C, the perception task results corresponding to the three-dimensional target detection task and the map semantic segmentation task are unified, so that not only is the processing efficiency of the perception task improved, but also the decision safety is improved.

Figure 13:
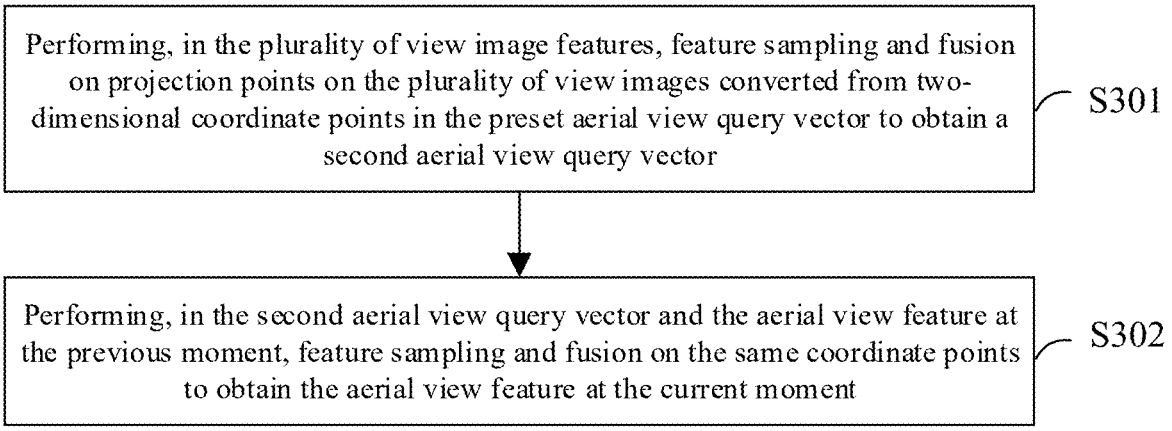
FIG. 13 is a flowchart illustrating optional steps of still another image processing method provided in an embodiment of the present application.

In some embodiments, the S102 in FIG. 1 described above may further be implemented by S301-S302. As shown in FIG. 13, FIG. 13 is a flowchart illustrating optional steps of still another image processing method provided in an embodiment of the present application.

S301. performing, in the plurality of view image features, feature sampling and fusion on projection points on the plurality of view images converted from two-dimensional coordinate points in the preset aerial view query vector to obtain a second aerial view query vector.

S302, performing, in the second aerial view query vector and the aerial view feature at the previous moment feature, sampling and fusion on the same coordinate points to obtain the aerial view feature at the current moment.

Figure 14:
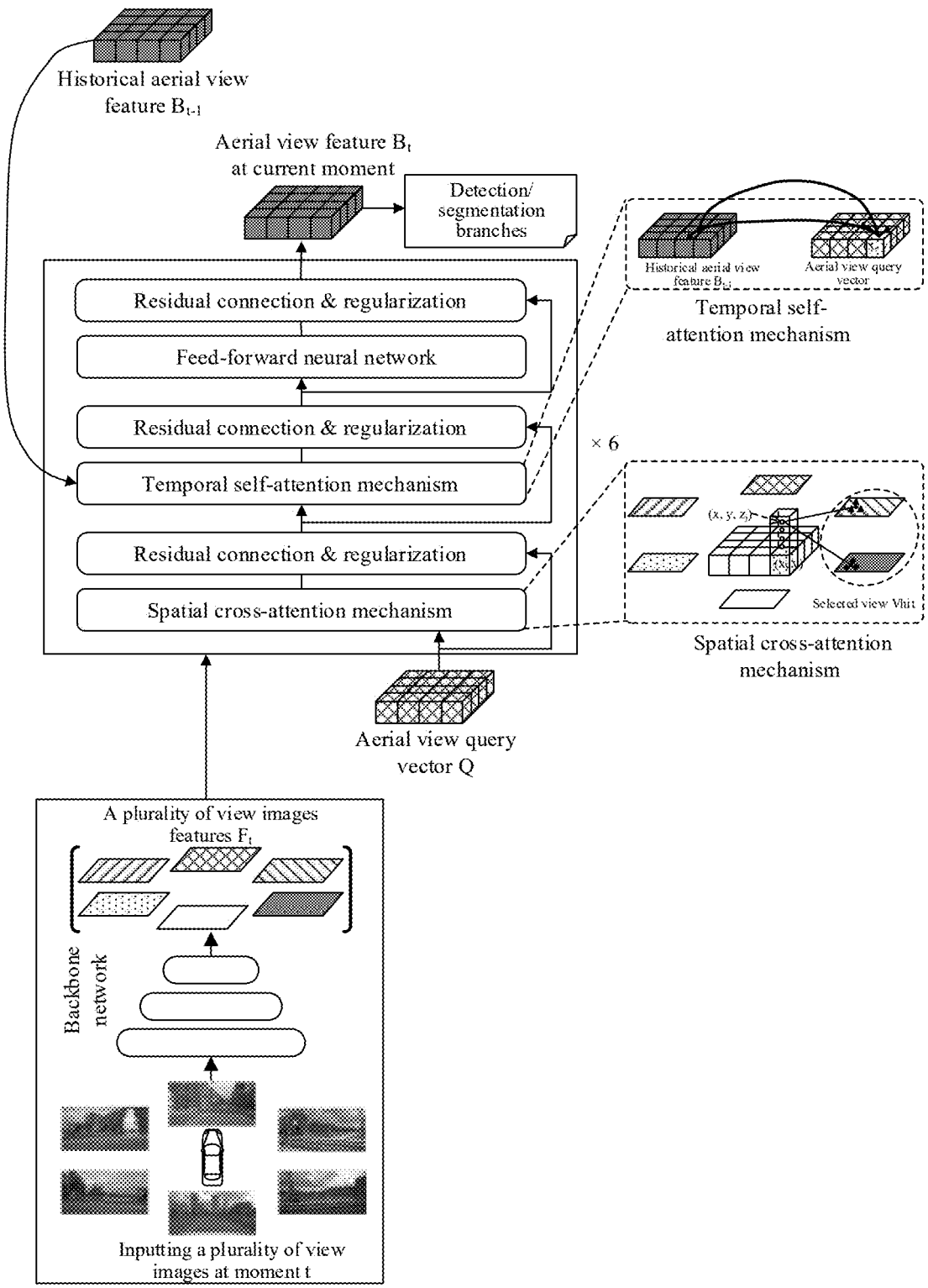
FIG. 14 is an optional structural schematic diagram of another aerial view generator provided in an embodiment of the present application.

In the embodiment of the present application, an image processing method is described with reference to FIG. 14, and FIG. 14 is an optional structural schematic diagram of another aerial view generator provided in an embodiment of the present application. The image processing method provided in FIG. 3 and the schematic structural diagram of the aerial view generator provided in FIG. 11 are to extract temporal information from the aerial view feature at the previous moment by using a temporal self-attention mechanism, and then to extract spatial information from the plurality of view image features by using a spatial cross-attention mechanism. The image processing method provided in FIG. 13 and the schematic structural diagram of the aerial view generator provided in FIG. 14 are to extract spatial information from a plurality of view image features by using a spatial cross-attention mechanism, and then to extract temporal information from the aerial view feature at the previous moment by using a temporal self-attention mechanism. In both FIGS. 11 and 14, when information is extracted, the aerial view feature still exists in the extraction process, and the steps of extracting temporal information and extracting spatial information are the same between them, and only the inputs are different. Illustratively, when spatial information extraction is performed, a first aerial view query vector (with temporal information fused) and a plurality of view image features F; are inputted into FIG. 11; an aerial view query vector Q and a plurality of view image features F; are inputted into FIG. 14. When the temporal information extraction is performed, the aerial view query vector Q and the historical aerial view feature But are inputted into FIG. 11: the second aerial view query vector (with the spatial information fused) and the historical the aerial view feature But are inputted into FIG. 14.

In some embodiments, the S301 described above may further be implemented by the following: obtaining an intrinsic matrix and an extrinsic matrix of the acquisition apparatus; performing feature extraction on the plurality of view images to obtain the plurality of view image features; converting each two-dimensional coordinate point in the preset aerial view query vector into a plurality of three-dimensional spatial points to obtain a plurality of three-dimensional spatial points corresponding to two-dimensional coordinate points; projecting the plurality of three-dimensional spatial points corresponding to the two-dimensional coordinate points to at least one view image according to the intrinsic matrix and the extrinsic matrix to obtain a plurality of projection points of the two-dimensional coordinate points; and performing dense sampling in the plurality of view image features and performing feature fusion thereon to obtain the second aerial view query vector according to the plurality of projection points of the two-dimensional coordinate points.

In some embodiments, the S302 described above may further be implemented by the following: obtaining a motion state of the vehicle from the previous moment to the current moment; according to the motion state of the vehicle, aligning the aerial view feature at the previous moment with the second aerial view query vector to obtain a second aerial view feature, and enabling the same coordinate points of the second aerial view feature and the second aerial view query vector to represent the same real scene physical position; predicting a third set of offsets and a fourth set of offsets for coordinate points in the second aerial view query vector, wherein the third set of offsets represent a plurality of offset coordinates corresponding to the coordinate points in the second aerial view query vector, and the fourth set of offsets represent a plurality of offset coordinates corresponding to the coordinate points in the second aerial view feature: determining a plurality of sampling points corresponding to the coordinate points in the second aerial view query vector and the second aerial view feature according to the third set of offsets and the fourth set of offsets; and performing fusion on the plurality of sampling points corresponding to the coordinate points and features sampled from the second aerial view query vector and the second aerial view feature to obtain the aerial view feature at the current moment.

In the embodiment of the present application, the specific implementation process and the beneficial effects of FIG. 13 and FIG. 14 described above when extracting spatial information can be referred in detail to FIG. 7 to FIG. 9 described above, and the specific implementation process and the beneficial effects of FIG. 13 and FIG. 14 described above when extracting temporal information can be referred in detail to FIG. 4 to FIG. 6; the specific implementation process and the beneficial effects of FIG. 13 and FIG. 14 described above when performing a plurality of perception task processing can be referred in detail to FIG. 10, and the visualization results of a plurality of perceptual tasks realized according to the image processing method provided in FIG. 13 and FIG. 14 described above can be referred in detail to FIG. 12A and FIG. 12C described above. These implementation process is not described herein again.

Figure 15:
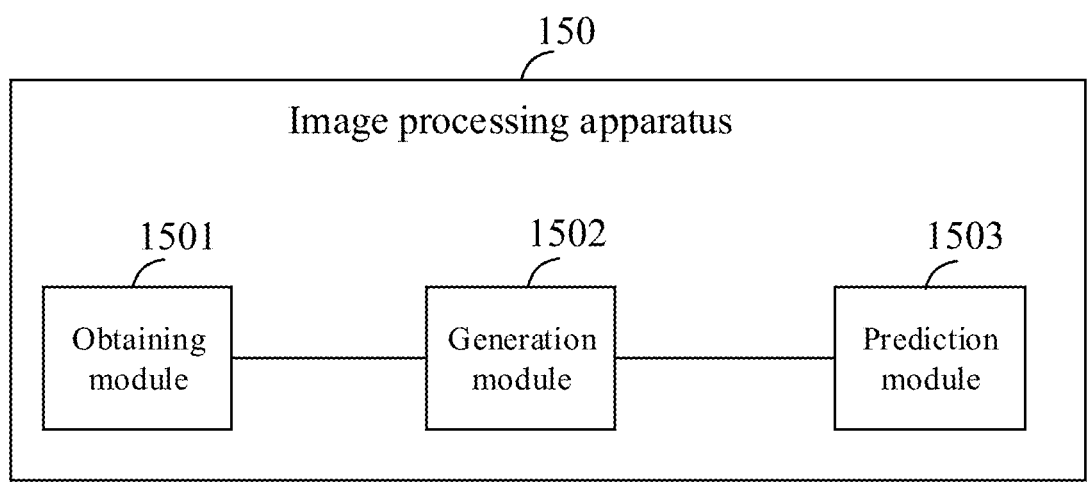
FIG. 15 is an optional structural diagram of an image processing apparatus provided in an embodiment of the present application.

In order to implement the image processing method provided in the embodiment of the present application, an embodiment of the present application further provides an image processing apparatus, as shown in FIG. 15, where FIG. 15 is an optional structural diagram of an image processing apparatus provided in an embodiment of the present application, and the apparatus 150 comprises: an obtaining module 1501, configured to obtain a plurality of view images captured by a plurality of acquisition apparatuses at different views on a vehicle and an aerial view feature at a previous moment of a current moment; a generation module 1502, configured to extract temporal information from the aerial view feature at the previous moment according to a preset aerial view query vector, extract spatial information from a plurality of view image features corresponding to the plurality of view images, and combine the temporal information and the spatial information to generate an aerial view feature at the current moment, wherein the preset aerial view query vector corresponds to a three-dimensional physical world which is a preset range away from the vehicle in a real scene at the current moment; and a prediction module 1503, configured to perform prediction on a perception task according to the aerial view feature at the current moment to obtain a perception task result.

In some embodiments, the generation module 1502 is further configured to perform feature sampling and fusion on the same position points in the preset aerial view query vector and the aerial view feature at the previous moment to obtain a first aerial view query vector; and perform, in the plurality of view image features, feature sampling and fusion on projection points on the plurality of view images converted from two-dimensional position points in the first aerial view query vector to obtain the aerial view feature at the current moment.

In some embodiments, the obtaining module 1501 is further configured to obtain a motion state of the vehicle from the previous moment to the current moment;

The generation module 1502 is further configured to align the aerial view feature at the previous moment with the preset aerial view query vector according to the motion state of the vehicle to obtain a first aerial view feature, and enable the same position points of the first aerial view feature and the preset aerial view query vector to represent the same real scene physical position; predict two sets of offsets for position points in the preset aerial view query vector, wherein the first set of offsets represent a plurality of offset coordinates corresponding to the position points in the preset aerial view query vector, and the second set of offsets represents a plurality of offset coordinates corresponding to the position points in the first aerial view feature; determine a plurality of sampling points corresponding to the position points in the preset aerial view query vector and the first aerial view feature according to the two sets of offsets; and perform fusion on the plurality of sampling points corresponding to the position points and features sampled in the preset aerial view query vector and the first aerial view feature to obtain the first aerial view query vector.

In some embodiments, the sampling points include a first sampling point and a second sampling point;

The generation module 1502 is further configured to determine a plurality of first sampling points corresponding to the position points in the preset aerial view query vector according to the position points and the first set of offsets; and determine a plurality of second sampling points corresponding to the position points in the first aerial view feature according to the position points and the second set of offsets.

In some embodiments, the generation module 1502 is further configured to determine first image features of the position points according to the plurality of first sampling points corresponding to the position points and the preset aerial view query vector; determine second image features of the position points according to the plurality of second sampling points corresponding to the position points and the first aerial view feature; perform fusion on the first image features of the position points and the second image features of the position points to obtain the fused features of the position points; and take the fused features of the position points as the first aerial view query vector.

In some embodiments, the generation module 1502 is further configured to extract features from a preset aerial view query vector according to the plurality of first sampling points corresponding to the position points to obtain image features of the plurality of first sampling points corresponding to the position points; and fusing the image features of the plurality of first sampling points corresponding to the position points according to preset weights of the plurality of first sampling points to obtain the first image features of the position points.

In some embodiments, the generation module 1502 is further configured to extract features from the first aerial view feature according to the plurality of second sampling points corresponding to the position points to obtain image features of the plurality of second sampling points corresponding to the position points; and perform fusion on the image features of the plurality of second sampling points corresponding to the position points according to preset weights of the plurality of second sampling points to obtain the second image features of the position points.

In some embodiments, the generation module 1502 is further configured to take an aerial view query vector at an initial moment as an aerial view feature at the initial moment; extract an initial temporal information from the aerial view feature at the initial moment according to the aerial view query vector at the initial moment, extract initial spatial information from a plurality of view image features corresponding to the initial moment, and combine the initial temporal information and the initial spatial information to generate the aerial view feature at the initial moment; wherein the aerial view feature at the initial moment is configured to perform prediction on an aerial view feature at a next moment.

In some embodiments, the obtaining module 1501 is further configured to obtain an intrinsic matrix and an extrinsic matrix of the acquisition apparatus;

The generation module 1502 is further configured to perform feature extraction on the plurality of view images to obtain the plurality of view image features; convert each two-dimensional position point in the first aerial view query vector into a plurality of three-dimensional spatial points to obtain a plurality of three-dimensional spatial points corresponding to two-dimensional position points; project the plurality of three-dimensional spatial points corresponding to the two-dimensional position points to at least one view image according to the intrinsic matrix and the extrinsic matrix to obtain a plurality of projection points of the two-dimensional position points; and perform dense sampling in the plurality of view image features and perform feature fusion thereon to obtain the aerial view feature at the current moment according to the plurality of projection points of the two-dimensional position points.

In some embodiments, the generation module 1502 is further configured to determine, for each two-dimensional position point, sampling ranges corresponding to the projection points according to position information of the projection points; perform sampling in the view image features corresponding to the projection points according to the sampling ranges corresponding to the projection points to obtain image features of the projection points; perform fusion on image features of the projection points corresponding to the same two-dimensional position point to obtain image features of the two-dimensional position points; and perform fusion on image features of the plurality of two-dimensional position points to obtain the aerial view feature at the current moment.

In some embodiments, the generation module 1502 is further configured to determine geometric ranges formed by taking the projection points as centers as sampling ranges corresponding to the projection points; or, determine a plurality of acquisition points of the projection points within preset ranges of the projection points; and take the plurality of acquisition points of the projection points as sampling ranges corresponding to the projection points.

In some embodiments, the generation module 1502 is further configured to perform feature sampling and fusion on the same position points in the preset aerial view query vector and the aerial view feature at the previous moment, and combine the preset aerial view query vector to obtain a first aerial view query vector; perform, in the plurality of view image features, feature sampling and fusion on projection points on the plurality of view images converted from two-dimensional position points in the first aerial view query vector, and combine the first aerial view query vector to obtain a target aerial view query vector; and perform preset information reinforcement on the target aerial view query vector, and combine the target aerial view query vector to obtain the aerial view feature at the current moment.

In some embodiments, the generation module 1502 is further configured to perform, in the plurality of view image features, feature sampling and fusion on projection points on the plurality of view images converted from two-dimensional coordinate points in the preset aerial view query vector to obtain a second aerial view query vector; and perform, in the second aerial view query vector and the aerial view feature at the previous moment feature, sampling and fusion on the same coordinate points to obtain the aerial view feature at the current moment.

In some embodiments, the obtaining module 1501 is further configured to obtain an intrinsic matrix and an extrinsic matrix of the acquisition apparatus;

The generation module 1502 is further configured to perform feature extraction on the plurality of view images to obtain the plurality of view image features; convert each two-dimensional coordinate point in the preset aerial view query vector into a plurality of three-dimensional spatial points to obtain a plurality of three-dimensional spatial points corresponding to two-dimensional coordinate points; project the plurality of three-dimensional spatial points corresponding to the two-dimensional coordinate points to at least one view image according to the intrinsic matrix and the extrinsic matrix to obtain a plurality of projection points of the two-dimensional coordinate points; and perform dense sampling in the plurality of view image features and performing feature fusion thereon to obtain the second aerial view query vector according to the plurality of projection points of the two-dimensional coordinate points.

In some embodiments, the obtaining module 1501 is further configured to obtain a motion state of the vehicle from the previous moment to the current moment;

The generation module 1502 is further configured to align the aerial view feature at the previous moment with the second aerial view query vector according to the motion state of the vehicle to obtain a second aerial view feature, and enable the same coordinate points of the second aerial view feature and the second aerial view query vector to represent the same real scene physical position; predict a third set of offsets and a fourth set of offsets for coordinate points in the second aerial view query vector, wherein the third set of offsets represent a plurality of offset coordinates corresponding to the coordinate points in the second aerial view query vector, and the fourth set of offsets represent a plurality of offset coordinates corresponding to the coordinate points in the second aerial view feature; determine a plurality of sampling points corresponding to the coordinate points in the second aerial view query vector and the second aerial view feature according to the third set of offsets and the fourth set of offsets; and perform fusion on the plurality of sampling points corresponding to the coordinate points and features sampled from the second aerial view query vector and the second aerial view feature to obtain the aerial view feature at the current moment.

In some embodiments, the prediction module 1503 is further configured to perform prediction on at least two perception tasks according to the aerial view feature at the current moment to obtain at least two perception task results; wherein the perception tasks comprise a three-dimensional target detection task, a map instance segmentation task, a driving track planning task and a lane line position detection task.

It should be noted that, when the image processing apparatus provided in the embodiment described above performs image processing, only the division of the program modules described above is taken as an example for illustration: in practical applications, the above processing distribution may be completed by different program modules as needed, that is, the internal structure of the apparatus is divided into different program modules to complete all or part of the processing described above. In addition, the image processing apparatus provided in the embodiment above and the embodiment of image processing method belong to the same concept, and specific implementation processes and beneficial effects of the image processing apparatus are detailed in the method embodiment, and are not described herein again. For technical details not disclosed in the embodiment of the apparatus, reference is made to the description of the embodiment of the method of the present application for understanding.

Figure 16:
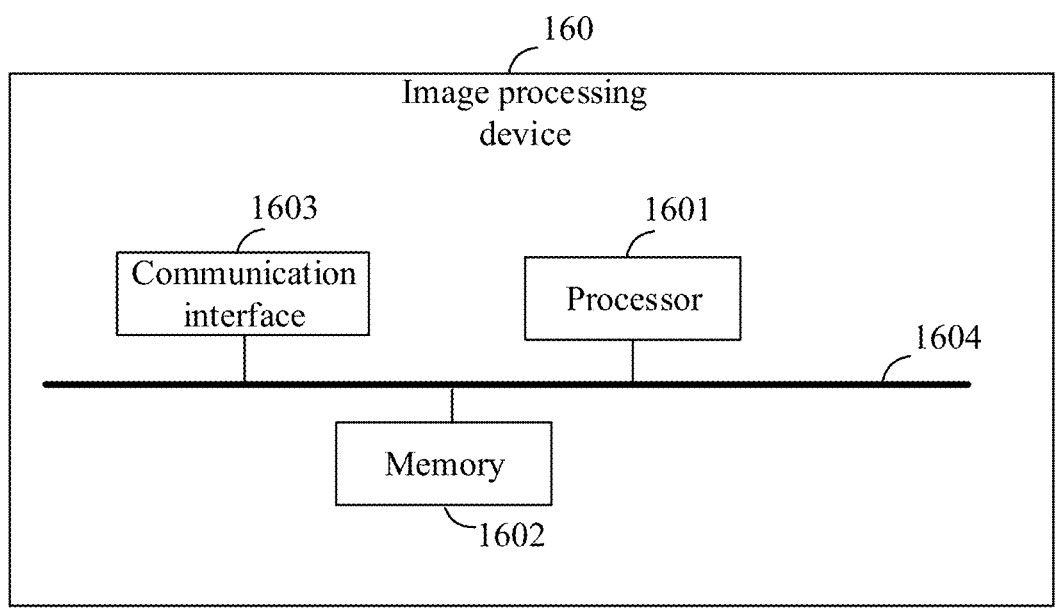
FIG. 16 is a schematic diagram of the structure of the composition of an image processing device provided in an embodiment of the present application.

In the embodiment of the present application. FIG. 16 is a schematic structural diagram of the component of the structure of an image processing device provided in an embodiment of the present application, and as shown in FIG. 16, a device 160 provided in the embodiment of the present application comprises a processor 1601 and a memory 1602 configured to store an executable computer program, wherein the processor 1601 is configured to implement the image processing method provided in the embodiment of present application when executing the executable computer program stored in the memory 1602. In some embodiments, the image processing device 160 may further comprise a communication interface 1603, and a bus 1604 configured to connect the processor 1601, the memory 1602 and the communication interface 1603.

In the embodiment of the present application, the bus 1604 is configured to connect the communication interface 1603, the processor 1601 and the memory 1602 to realize mutual communication among these devices.

The memory 1602 is configured to store executable computer programs and data, the executable computer programs comprising computer operating instructions, and the memory 1602 may comprise high-speed RAM memory and may further comprise non-volatile memory, such as at least two disk memories. In practical applications, the memory 1602 described above may be a volatile memory, such as a random-access memory (RAM); or a non-volatile memory, such as a read-only memory (ROM), a flash memory, a hard disk drive (HDD) or a solid-state drive (SSD); or a combination of the above types of memories, and provides executable computer programs and data to the processor 1601.

In addition, the functional units in the embodiment can be integrated into one processing unit, or each unit can exist physically alone, or two or more units can be integrated in one unit. The integrated units described above can be realized in the form of hardware or software functional modules.

The integrated unit may be stored in a computer-readable storage medium if it is implemented in the form of a software functional module and sold or used as a separate product; based on such understanding, the technical scheme of the present embodiment essentially can be, or part of the technical scheme contributing to the prior art can be, or all or part of the technical scheme can be embodied in the form of a software product. The computer software product is stored in a storage medium and comprises several instructions for enabling a computer device (which can be a personal computer, a server, a network device or the like) or a processor to implement all or part of the steps of the method described in the present embodiment. The aforementioned storage medium comprises: a U-disk, a removable hard disk, a read only memory (ROM), a random access memory (RAM), a magnetic disk, an optical disk, or other various media capable of storing program codes.

The embodiment of the present application provides a computer-readable storage medium having a computer program stored thereon that, when executed by a processor, is configured to implement the image processing method according to any one of the embodiments described above.

Illustratively, the program instructions corresponding to an image processing method in the present embodiment may be stored on a storage medium such as an optical disc, a hard disc or a U-disk, and when the program instructions in the storage medium corresponding to an image processing method are read or executed by an electronic device, the image processing method according to any one of the embodiments described above may be implemented.

It should be appreciated by those skilled in the art that the embodiments of the present application may be provided as a method, a system or a computer program product. Accordingly, the present application may take the forms of a hardware embodiment, a software embodiment or an embodiment combining software and hardware. Furthermore, the present application may take the form of a computer program product implemented on one or more computer-usable storage media (including, but not limited to, disk memory, optical memory and the like) containing computer-usable program codes.

The present application is described with reference to schematic flowcharts and/or block diagrams of implementations of methods, devices (systems) and computer program products according to embodiments of the present application. It should be understood that each flow and/or block of the schematic flowcharts and/or block diagrams, and combinations of flows and/or blocks in the schematic flowcharts and/or block diagrams, can be implemented by computer program instructions. These computer program instructions may be provided to a processor of a general purpose computer, a special purpose computer, an embedded processor or other programmable data processing device to produce a machine, such that the instructions executed by the processor of the computer or other programmable data processing devices produce an apparatus for implementing the functions specified in implementing one or more procedures in the schematic flowcharts and/or one or more blocks of block diagrams.

These computer program instructions may also be stored in a computer-readable memory that can direct a computer or other programmable data processing devices to operate in a particular manner, such that the instructions stored in the computer-readable memory produce a product comprising an instruction apparatus which implements the functions specified implementing one or more procedures in the schematic flowcharts and/or one or more blocks of block diagrams.

These computer program instructions may also be loaded onto a computer or other programmable data processing devices to allow a series of operation steps to be performed on the computer or other programmable devices to produce a computer implemented process, such that the instructions executed on the computer or other programmable device provide steps for implementing the functions specified in implementing one or more procedures in the schematic flowcharts and/or one or more blocks of block diagrams.

The above description is a preferred embodiment of the present application, and is not intended to limit the protection scope of the present application.

What is claimed is:

1. An image processing method, performed by a device equipped with autonomous driving functionality, wherein the method comprises:
   obtaining a plurality of view images captured by a plurality of acquisition apparatuses at different views on a vehicle and an aerial view feature at a previous moment of a current moment;
   extracting temporal information from the aerial view feature at the previous moment according to a preset aerial view query vector, extracting spatial information from a plurality of view image features corresponding to the plurality of view images, and combining the temporal information and the spatial information to generate an aerial view feature at the current moment, wherein the preset aerial view query vector corresponds to a three-dimensional physical world which is a preset range away from the vehicle in a real scene at the current moment; and
   performing prediction on a perception task according to the aerial view feature at the current moment to obtain a perception task result;
   wherein the extracting temporal information from the aerial view feature at the previous moment according to a preset aerial view query vector, extracting spatial information from a plurality of view image features corresponding to the plurality of view images, and combining the temporal information and the spatial information to generate an aerial view feature at the current moment comprises:
   performing feature sampling and fusion on the same position points in the preset aerial view query vector and the aerial view feature at the previous moment to obtain a first aerial view query vector; and
   in the plurality of view image features, performing feature sampling and fusion on projection points on the plurality of view images converted from two-dimensional position points in the first aerial view query vector to obtain the aerial view feature at the current moment;
   wherein the performing feature sampling and fusion on the same position points in the preset aerial view query vector and the aerial view feature at the previous moment to obtain a first aerial view query vector comprises:
  obtaining a motion state of the vehicle from the previous moment to the current moment;
  according to the motion state of the vehicle, aligning the aerial view feature at the previous moment with the preset aerial view query vector to obtain a first aerial view feature, and enabling the same position points of the first aerial view feature and the preset aerial view query vector to represent the same real scene physical position;
  predicting two sets of offsets for position points in the preset aerial view query vector, wherein the first set of offsets represent a plurality of offset coordinates corresponding to the position points in the preset aerial view query vector, and the second set of offsets represents a plurality of offset coordinates corresponding to the position points in the first aerial view feature;
  determining a plurality of sampling points corresponding to the position points in the preset aerial view query vector and the first aerial view feature according to the two sets of offsets; and
  performing fusion on the plurality of sampling points corresponding to the position points and features sampled in the preset aerial view query vector and the first aerial view feature to obtain the first aerial view query vector.

2. The method according to claim 1, wherein the sampling points comprise a first sampling point and a second sampling point;
  the determining a plurality of sampling points corresponding to the position points in the preset aerial view query vector and the first aerial view feature according to the two sets of offsets comprises:
  determining a plurality of the first sampling points corresponding to the position points in the preset aerial view query vector according to the position points and the first set of offsets; and
  determining a plurality of the second sampling points corresponding to the position points in the first aerial view feature according to the position points and the second set of offsets.

3. The method according to claim 2, wherein the performing fusion on the plurality of sampling points corresponding to the position points and features sampled in the preset aerial view query vector and the first aerial view feature to obtain the first aerial view query vector comprises:
  determining first image features of the position points according to the plurality of the first sampling points corresponding to the position points and the preset aerial view query vector;
  determining second image features of the position points according to the plurality of the second sampling points corresponding to the position points and the first aerial view feature;
  performing fusion on the first image features of the position points and the second image features of the position points to obtain the fused features of the position points; and
  taking the fused features of the position points as the first aerial view query vector.

4. The method according to claim 3, wherein the determining first image features of the position points according to the plurality of the first sampling points corresponding to the position points and the preset aerial view query vector comprises:
  extracting features from the preset aerial view query vector according to the plurality of the first sampling points corresponding to the position points to obtain image features of the plurality of the first sampling points corresponding to the position points; and
  according to preset weights of the plurality of the first sampling points, performing fusion on the image features of the plurality of the first sampling points corresponding to the position points to obtain the first image features of the position points.

5. The method according to claim 3, wherein the determining second image features of the position points according to the plurality of the second sampling points corresponding to the position points and the first aerial view feature comprises:
  extracting features from the first aerial view feature according to the plurality of the second sampling points corresponding to the position points to obtain image features of the plurality of the second sampling points corresponding to the position points; and
  according to preset weights of the plurality of the second sampling points, performing fusion on the image features of the plurality of the second sampling points corresponding to the position points to obtain the second image features of the position points.

6. The method according to claim 1, wherein the performing, in the plurality of view image features, feature sampling and fusion on projection points on the plurality of view images converted from two-dimensional position points in the first aerial view query vector to obtain the aerial view feature at the current moment comprises:
  obtaining an intrinsic matrix and an extrinsic matrix of the acquisition apparatus;
  performing feature extraction on the plurality of view images to obtain the plurality of view image features;
  converting each two-dimensional position point in the first aerial view query vector into a plurality of three-dimensional spatial points to obtain a plurality of three-dimensional spatial points corresponding to two-dimensional position points;
  projecting the plurality of three-dimensional spatial points corresponding to the two-dimensional position points to at least one view image according to the intrinsic matrix and the extrinsic matrix to obtain a plurality of projection points of the two-dimensional position points; and
  performing dense sampling in the plurality of view image features and performing feature fusion thereon to obtain the aerial view feature at the current moment according to the plurality of projection points of the two-dimensional position points.

7. The method according to claim 6, wherein the performing dense sampling in the plurality of view image features and performing feature fusion thereon to obtain the aerial view feature at the current moment according to the plurality of projection points of the two-dimensional position points comprises:
  determining, for each two-dimensional position point, sampling ranges corresponding to the projection points according to position information of the projection points;
  performing sampling in the view image features corresponding to the projection points according to the sampling ranges corresponding to the projection points to obtain image features of the projection points;
  performing fusion on image features of the projection points corresponding to the same two-dimensional position point to obtain image features of the two-dimensional position points; and performing fusion on image features of the plurality of two-dimensional position points to obtain the aerial view feature at the current moment.

8. The method according to claim 7, wherein the determining sampling ranges corresponding to the projection points according to position information of the projection points comprises:

determining geometric ranges formed by taking the projection points as centers as sampling ranges corresponding to the projection points;

or, determining a plurality of acquisition points of the projection points within preset ranges of the projection points; and taking the plurality of acquisition points of the projection points as sampling ranges corresponding to the projection points.

9. The method according to claim 1, wherein the performing feature sampling and fusion on the same position points in the preset aerial view query vector and the aerial view feature at the previous moment to obtain a first aerial view query vector; and in the plurality of view image features, performing feature sampling and fusion on projection points on the plurality of view images converted from two-dimensional position points in the first aerial view query vector to obtain the aerial view feature at the current moment comprises:

performing feature sampling and fusion on the same position points in the preset aerial view query vector and the aerial view feature at the previous moment, and combining the preset aerial view query vector to obtain a first aerial view query vector;

in the plurality of view image features, performing feature sampling and fusion on projection points on the plurality of view images converted from two-dimensional position points in the first aerial view query vector, and combining the first aerial view query vector to obtain a target aerial view query vector; and performing preset information reinforcement on the target aerial view query vector, and combining the target aerial view query vector to obtain the aerial view feature at the current moment.

10. The method according to claim 1, wherein the extracting temporal information from the aerial view feature at the previous moment according to a preset aerial view query vector, extracting spatial information from a plurality of view image features corresponding to the plurality of view images, and combining the temporal information and the spatial information to generate an aerial view feature at the current moment comprises:

in the plurality of view image features, performing feature sampling and fusion on projection points on the plurality of view images converted from two-dimensional coordinate points in the preset aerial view query vector to obtain a second aerial view query vector; and performing, in the second aerial view query vector and the aerial view feature at the previous moment, feature sampling and fusion on the same coordinate points to obtain the aerial view feature at the current moment.

11. The method according to claim 10, wherein the performing, in the plurality of view image features, feature sampling and fusion on projection points on the plurality of view images converted from two-dimensional coordinate points in the preset aerial view query vector to obtain a second aerial view query vector comprises:

obtaining an intrinsic matrix and an extrinsic matrix of the acquisition apparatus;

performing feature extraction on the plurality of view images to obtain the plurality of view image features;

converting each two-dimensional coordinate point in the preset aerial view query vector into a plurality of three-dimensional spatial points to obtain a plurality of three-dimensional spatial points corresponding to two-dimensional coordinate points;

projecting the plurality of three-dimensional spatial points corresponding to the two-dimensional coordinate points to at least one view image according to the intrinsic matrix and the extrinsic matrix to obtain a plurality of projection points of the two-dimensional coordinate points; and performing dense sampling in the plurality of view image features and performing feature fusion thereon to obtain the second aerial view query vector according to the plurality of projection points of the two-dimensional coordinate points.

12. The method according to claim 10, wherein the performing, in the second aerial view query vector and the aerial view feature at the previous moment, feature sampling and fusion on the same coordinate points to obtain the aerial view feature at the current moment comprises:

obtaining a motion state of the vehicle from the previous moment to the current moment;

according to the motion state of the vehicle, aligning the aerial view feature at the previous moment with the second aerial view query vector to obtain a second aerial view feature, and enabling the same coordinate points of the second aerial view feature and the second aerial view query vector to represent the same real scene physical position;

predicting a third set of offsets and a fourth set of offsets for coordinate points in the second aerial view query vector, wherein the third set of offsets represent a plurality of offset coordinates corresponding to the coordinate points in the second aerial view query vector, and the fourth set of offsets represent a plurality of offset coordinates corresponding to the coordinate points in the second aerial view feature;

determining a plurality of sampling points corresponding to the coordinate points in the second aerial view query vector and the second aerial view feature according to the third set of offsets and the fourth set of offsets; and performing fusion on the plurality of sampling points corresponding to the coordinate points and features sampled from the second aerial view query vector and the second aerial view feature to obtain the aerial view feature at the current moment.

13. The method according to claim 1, wherein the performing prediction on a perception task according to the aerial view feature at the current moment to obtain a perception task result comprises:

performing prediction on at least two perception tasks according to the aerial view feature at the current moment to obtain at least two perception task results; wherein the perception tasks comprise a three-dimensional target detection task, a map instance segmentation task, a driving track planning task and a lane line position detection task.

14. An image processing device, wherein the device comprises:

a memory, configured to store an executable computer program; and a processor, configured to implement the method according to claim 1 when executing the executable computer program stored in the memory.

15. A computer-readable storage medium having a computer program stored thereon that, when executed by a processor, is configured to implement the method according to claim 1.

* * * * *